US009637697B2

(12) United States Patent
Narine et al.

(10) Patent No.: US 9,637,697 B2
(45) Date of Patent: *May 2, 2017

(54) POLYMORPHISM AND MICROSTRUCTURE OF CERTAIN TRIACYLGLYCEROLS AND FATTY ACID METHYL ESTERS

(71) Applicant: Trent University, Peterborough (CA)

(72) Inventors: Suresh Narine, Peterborough (CA); Laziz Bouzidi, Peterborough (CA); Bruce Darling, Peterborough (CA); Mark Baker, Peterborough (CA); Shaojun Li, Peterborough (CA); Ali Mahdevari, Peterborough (CA)

(73) Assignee: Trent University, Peterborough, Ontario (CA)

( * ) Notice: Subject to any disclaimer, the term of this patent is extended or adjusted under 35 U.S.C. 154(b) by 402 days.

This patent is subject to a terminal disclaimer.

(21) Appl. No.: 14/209,462

(22) Filed: Mar. 13, 2014

(65) Prior Publication Data

US 2014/0318001 A1 Oct. 30, 2014

Related U.S. Application Data

(60) Provisional application No. 61/785,418, filed on Mar. 14, 2013.

(51) Int. Cl.
C10L 1/18 (2006.01)
C10L 1/19 (2006.01)
C10L 10/14 (2006.01)

(52) U.S. Cl.
CPC .............. C10L 1/19 (2013.01); C10L 1/191 (2013.01); C10L 10/14 (2013.01); C10L 2200/0476 (2013.01)

(58) Field of Classification Search
CPC .. C10L 1/19; C10L 10/14; C10L 1/191; C10L 2200/0476
See application file for complete search history.

(56) References Cited

U.S. PATENT DOCUMENTS

2006/0236598 A1 10/2006 Selvidge
2010/0083567 A1 4/2010 Kürber et al.

FOREIGN PATENT DOCUMENTS

WO WO 2012/021959 A1 2/2012
WO WO 2013/156872 A2 10/2013

OTHER PUBLICATIONS

Herenqvist, L, Polymorphism of Triglycerides a Crystallographic Review, Food Structure: vol. 9:No. 1, Article 5 (1990).*
Shrestha et al., Effectiveness of Cold Flow Additives on Various Biodiesels, Diesel, and their Blends, American Soc. of Agricultural and Biological Engineers, vol. 51(4);pp. 1365-1370 (2008).*

(Continued)

Primary Examiner — Cephia D Toomer
(74) Attorney, Agent, or Firm — Bereskin & Parr LLP/S.E.N.C.R.L., s.r.l.; Michael Fenwick

(57) ABSTRACT

This application relates to the polymorphism and microstructure of certain triacylglycerols and fatty acid methyl esters, and how the properties of these individual components in a biodiesel fuel, as well as their combined mixtures, helps understand the fundamental mechanisms of their crystallization so as to design biodiesel fuels with improved low temperature characteristics.

12 Claims, 19 Drawing Sheets

(56) References Cited

OTHER PUBLICATIONS

International Search Report and the Written Opinion of the International Searching Authority issued in PCT Patent Application No. PCT/CA2014/050239, mailed May 28, 2014, 10 pages.

* cited by examiner

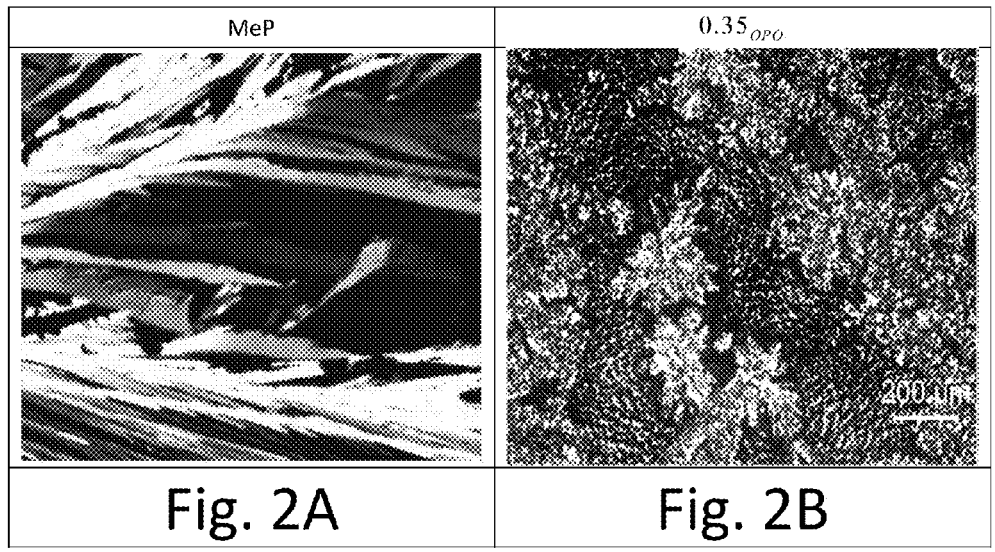
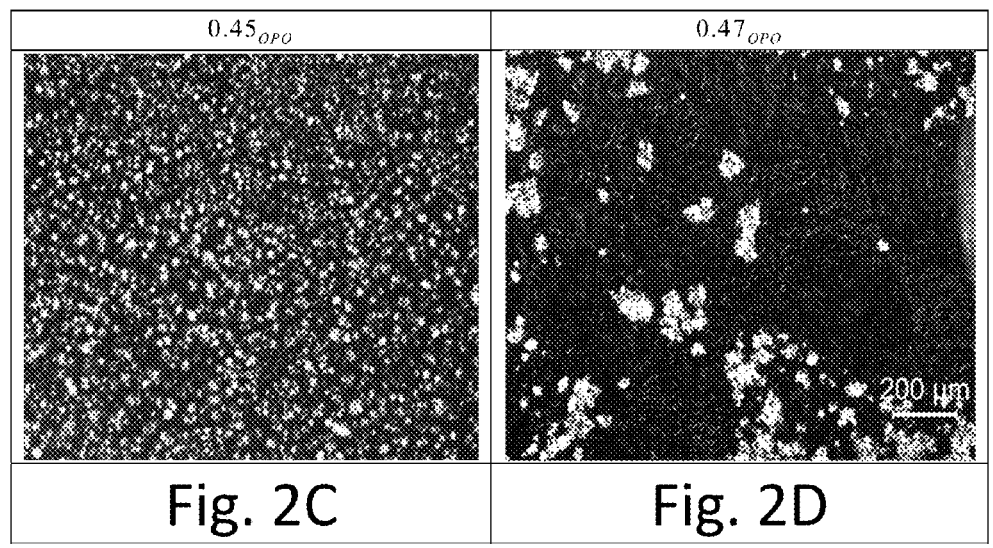

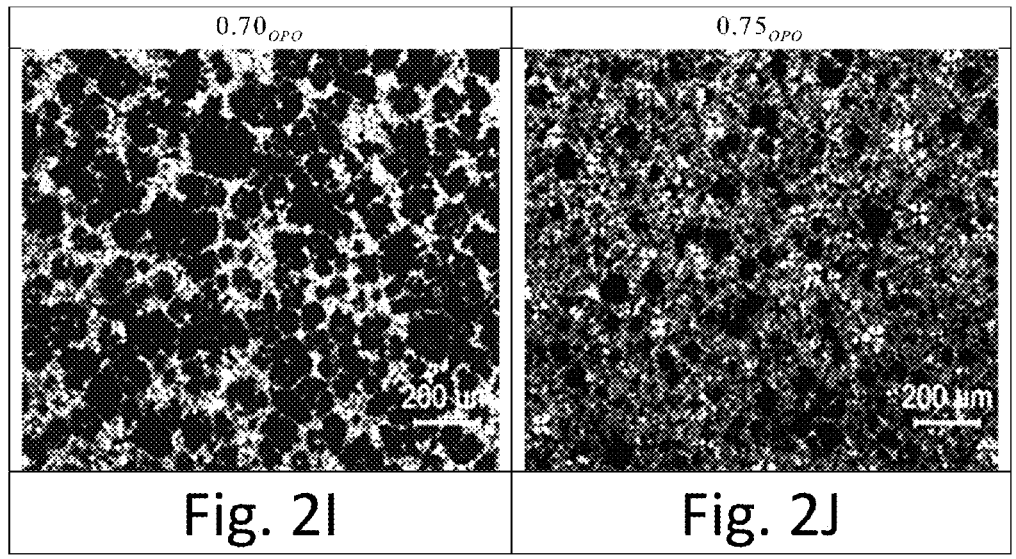
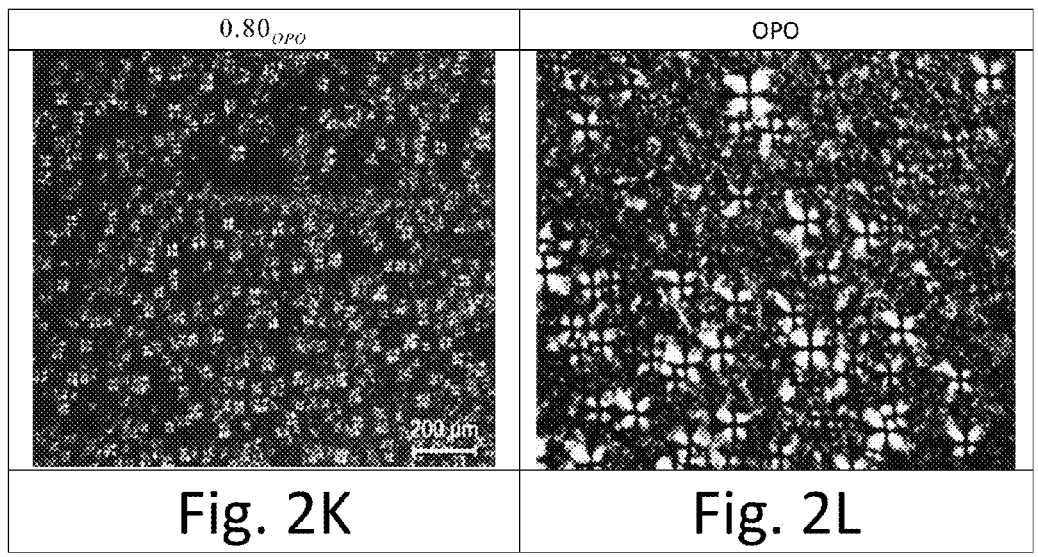

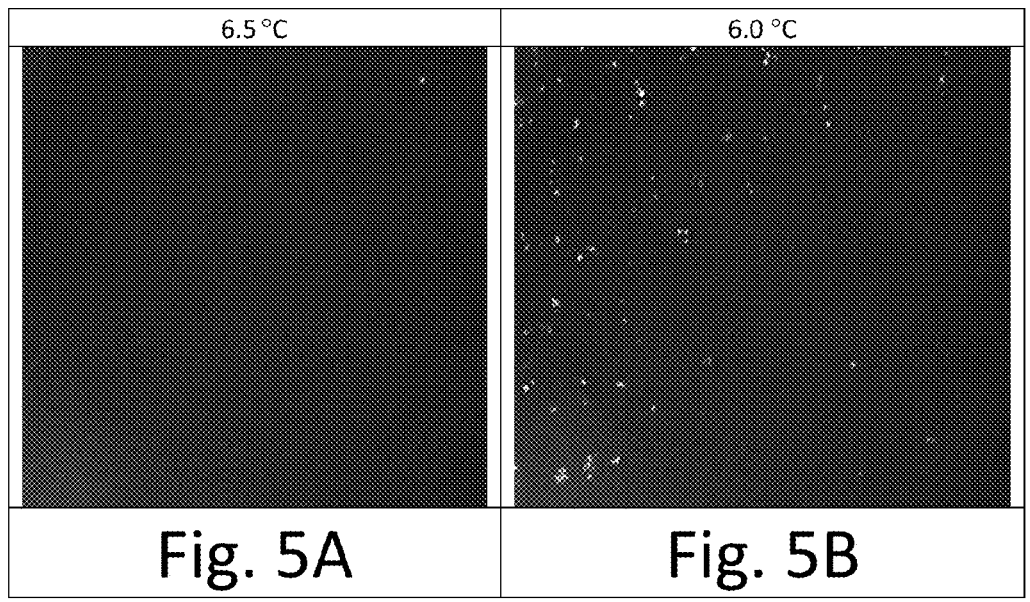
Fig. 5A
Fig. 5B
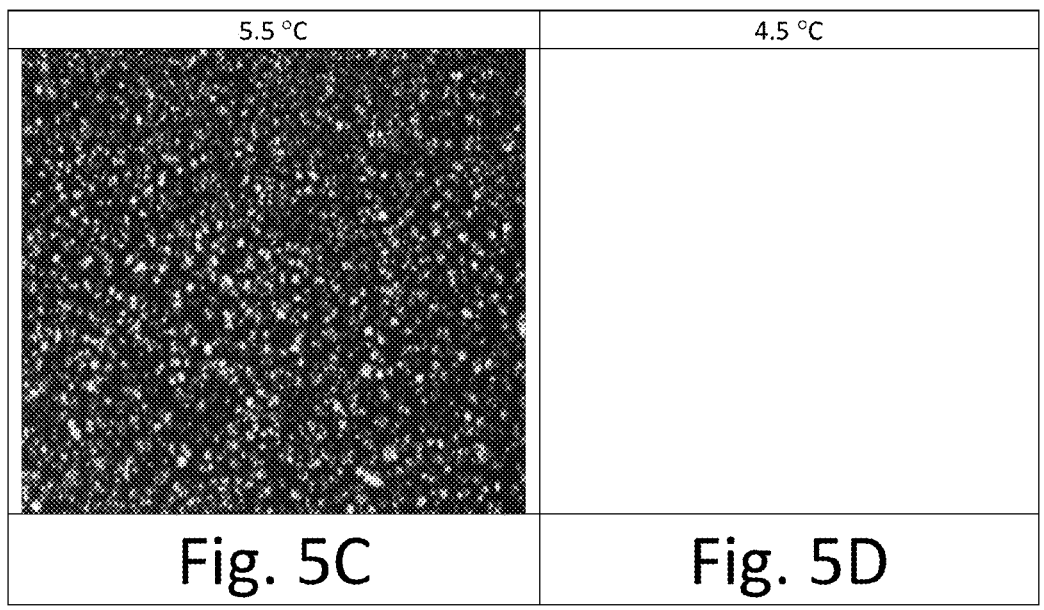
Fig. 5C
Fig. 5D (a) β - form of the OPO:MeP (1:1) compound. $d_{001}$ = 42.5 Å

(b) β' - of OPO $d_{001}$ = 44.5 Å

(c) $β_1$ - form of OPO $d_{001}$ = 63.5 Å

POLYMORPHISM AND MICROSTRUCTURE OF CERTAIN TRIACYLGLYCEROLS AND FATTY ACID METHYL ESTERS

CROSS REFERENCE TO RELATED APPLICATIONS

A claim of priority for this application under 35 U.S.C. §119(e) is hereby made to the following U.S. provisional patent application: U.S. Ser. No. 61/785,418 filed Mar. 14, 2013; and this application is incorporated herein by reference in its entirety.

FIELD OF THE INVENTION

This application relates to the polymorphism and microstructure of certain triacylglycerols and fatty acid methyl esters, and how the properties of these individual components in a biodiesel fuel, as well as their combined mixtures, helps understand the fundamental mechanisms of their crystallization so as to design biodiesel fuels with improved low temperature characteristics.

BACKGROUND OF THE INVENTION

Diesel fuels and/or biodiesel fuels typically contain wax, and when subjected to low temperatures, these fuels often undergo wax crystallization, gelling and/or viscosity increase. This reduces the ability of the fuel to flow and creates filter plugging which adversely affects the operability of vehicles using these fuels. Flow improvers have been used to modify the wax structure as it builds during cooling. These additives are typically used to keep the wax crystals small so that they can pass through fuel filters. Also, pour point dispersants are sometimes used in diesel fuel to ensure that it can be pumped at low temperatures.

Due to environmental concerns and the decline of known petroleum reserves with subsequent price increases of petroleum, biodiesel fuels are becoming a focus of intense research and development efforts. Biodiesel fuels typically comprise fatty acid esters, prepared for example by transesterifying triglycerides with lower alcohols, e.g. methanol or ethanol. A typical biodiesel fuel is the fatty acid ester of a natural oil (i.e. rapeseed oil or of soybean oil, as non-limiting examples). One of the major problems associated with the use of biodiesel is its poor cold flow properties resulting from crystallization of saturated fatty compounds in cold conditions, as indicated by its relatively high cloud points (CP) and pour points (PP). A 20° C. reduction in cold filter plugging point is necessary for some biodiesel fuels to find utility in colder climates such as those of North America and Europe in winter.

Several efforts to mitigate the low-temperature problems of biodiesel have been investigated over the past several years. Many popular approaches have included blending biodiesel with conventional diesel fuel, winterization, and use of synthetic additives. Also, studies have been performed to show the diversification in the feedstock and genetic modification of the feedstock, aimed to provide a reduction in the saturated content of the fatty acid methyl esters (FAME) in biodiesel as well as modification of FAME composition/profile of the fuels. While there have been efforts to create additives that may reduce the PP and cold filter plugging point (CFPP) of fuels, many are not cost effective. Also, increasing the unsaturated content of biodiesel may improve its cold flow properties, but also leads to the alteration of the oxidative stability of the fuel. The overall thermal behavior of biodiesel is affected by the relative concentration of its saturated and unsaturated FAME components. The cold flow issue is primarily a multifaceted problem of crystallization (of saturated FAMEs) in solution (unsaturated FAMEs) which can be approached from several angles.

Several approaches have been utilized to lower the onset temperature of crystallization of biodiesel, targeting particularly the saturated FAMEs such as methyl palmitate (MeP) and methyl stearate (MeS), which influence most its flow behavior at low temperature. The most popular approach is the use of crystallization depressant additives.

Saturated triacylglycerols (TAGs) and dimers of TAGs, particularly those having two double bonds at the sn-1 and sn-3 positions, have been found to be effective in suppressing the crystallization of FAMEs. It has been shown for example that FAMEs, such as MeS and MeP, and TAGs, such as 1,3-dioleoyl-2-palmitoyl glycerol (OPO) and 1,3-dioleoyl-2-stearoyl glycerol (OSO), form eutectic as well as peritectic systems through more or less loosely bound stoichiometric compounds. The eutectic temperatures induced by the TAGs were much lower than the melting points of both pure compounds.

In order to suppress the crystallization, an additive needs to concurrently have a structural similarity with the crystallizing substances in order to favor the required interaction, and features that would suppress the formation of organized structures. In the case of di-cis-unsaturated TAG molecules (such as OPO, OSO), we have found that the mechanism for disruption of crystallization is dependent on the peculiar geometry of the TAG: the "straight" acid chain promotes the interaction with the FAME (MeS, MeP) and participates easily in the lamellar packing of the equally "straight" FAME, while its two kinked unsaturated oleic acid chains effectively halts additional saturated FAMEs from participating in the packing due to steric hindrances. The interaction of the relatively large glycerol group of the TAG with the FAME molecules could be repulsive, adding to the suppression of the crystallization effect. This is realistic since the crystallization behavior of TAGs and FAMEs, and more generally of oils and fats, is directly related to structural details such as the length of the acyl chains, degree of unsaturation and conformation of the glycerol groups.

BRIEF DESCRIPTION OF THE SEVERAL VIEWS OF THE DRAWINGS

FIGS. 2A, 2B, 2C, 2D, 2E, 2F, 2G, 2H, 2I, 2J, 2K, and 2L depicts PLM (100× magnification) of selected OPO/MeP mixtures obtained at −50° C.

FIGS. 5A, 5B, 5C, and 5D depicts selected PLM images (100×) taken during the development from the melt of the microstructure of the first eutectic composition, E1 ($X_{OPO}$=0.45). Measurement temperatures are reported on top of these figures.

DETAILED DESCRIPTION OF THE INVENTION

It is generally known that additives suppress the crystallization of biodiesel and delays the rate of nucleation and/or crystal growth processes. At the nucleation level, additives delay the formation of critical nuclei from embryo clusters through molecular-level interactions between the crystallizing host molecules and the interfering additive molecules. The crystal growth is delayed when the additive prevents the adsorption and incorporation of crystallizing host molecules at the growing crystal surfaces. The additive is most efficient when both length scales are impacted. The disturbance to crystallization is therefore manifested at both the nanostructure and microstructure levels. The changes may be evidenced depending on concentration by specific changes to crystal structure and polymorphism, and microstructure, i.e., fat network and crystal shape and habit.

Polarized Light Microscopy (PLM) is an efficient technique to study the microstructure of lipid systems. The development of fat crystals from the start of crystallization to the complete fat network can be exposed by time/temperature resolved PLM, or thermo-microscopy. The technique also allows access to nucleation parameters when the rate of nucleation is low or the rate of crystal formation (number of crystals per time) is low, i.e., when individual crystals can be individually counted and considered as nuclei.

X-Ray Diffraction (XRD) is a useful tool for studying crystallization at the molecular and nanoscale levels. It allows access to the details of the lamellar packing, as well as the subcell structure of the fat crystals, and provides information on the intermolecular interactions at play during the development of the crystal phases. XRD also provides valuable information on the crystal arrangement, homogeneity and order state at the crystallized domains which are usually at the nanoscale. The technique provides access to the electronic density map which in turn provides an indication of the localization of atoms/group of atoms. This can be used to understand the molecular mechanisms involved in the crystallization of TAG/FAME systems, and can help unravel the role of TAGs in the noticeable reduction of crystallization temperature of FAMEs.

Figure 1:
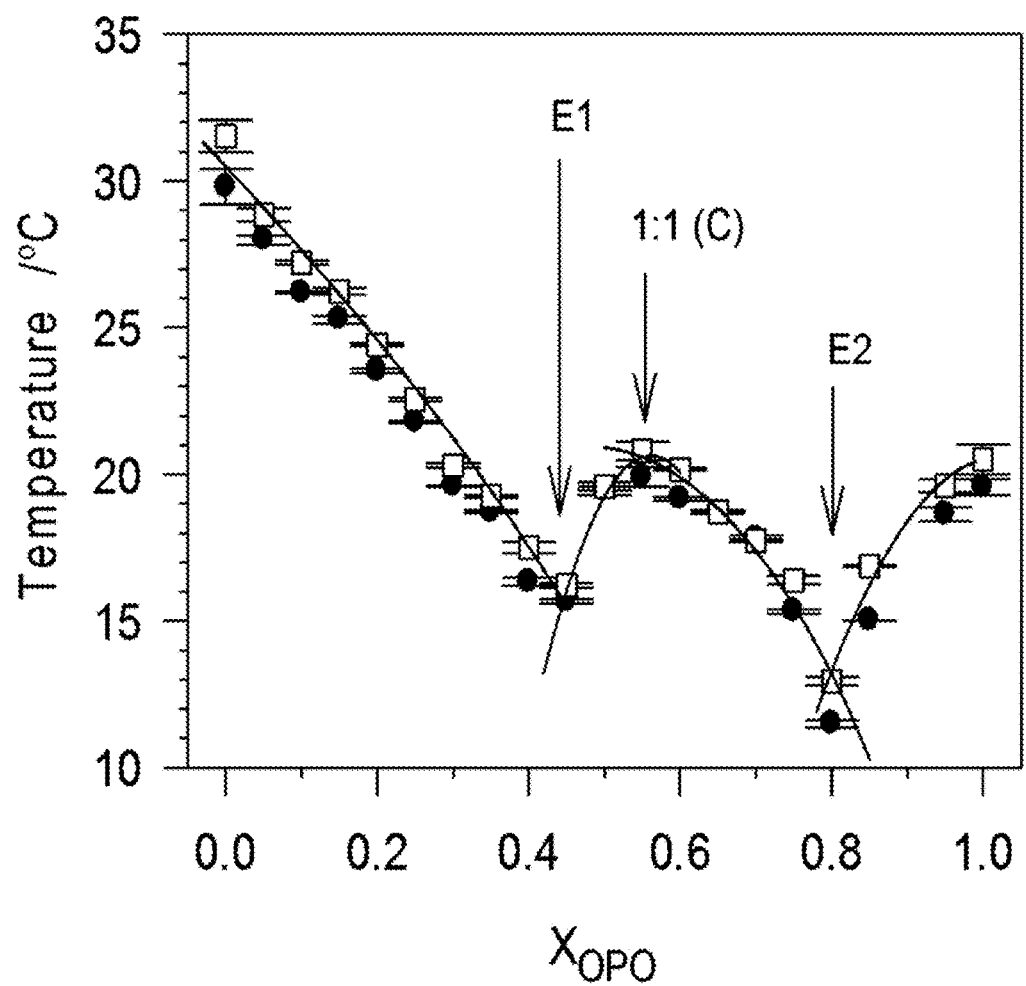
FIG. 1 depicts a Liquidus line in the phase diagram of the OPO/MeP binary system constructed from DSC heating data.

The present effort investigated the polymorphism and microstructure of the OPO/MeP model binary system using XRD and polarized light microscopy (PLM). The thermal behavior of this binary system has been previously described in commonly assigned U.S. Patent Application Ser. No. 61/780,817. The complex phase trajectories presented by this system upon both cooling and heating indicated a rich and complex polymorphism. A similarly rich microstructure is also expected as polymorphism significantly affects the microstructure development as well. A detailed thermal analysis by DSC of the OPO/MeP binary system demonstrated complex phase trajectories with several thermal transitions, including recrystallization from the melt. The liquidus line in the phase diagram constructed from the heating data is shown in FIG. 1. As can be seen, it presents two eutectic compositions, E1 at $0.40_{OPO}$ and E2 $0.80_{OPO}$ with eutectic temperatures at ~15° C. and ~12° C., respectively, separated by a singularity at $0.55_{OPO}$ indicative of the formation of a 1:1 compound (C).

Materials and Methods of Preparation of OPO and/or MeP

Materials 1,3-dioleoyl-2-palmitoyl glycerol (OPO) were synthesized and purified and Methyl Palmitate (MeP) was purchased (Aldrich Chemical Co. Inc.). Their purities were greater than 99% as determined by high performance liquid chromatography (HPLC). The TAG and FAME were mixed in 0.05 molar fraction increments. The melted sample was homogenized using a mechanical stirrer.

Polarized Light Microscopy

A polarized light microscope, PLM, (Leica DM2500P, Leica Microsystems, Wetzlar, Germany) fitted with a Leica (DFC420C) digital camera was used for image capture. A Linkam LS 350 temperature-controlled stage (Linkam Scientific Instruments, Tadworth, Surrey, UK) fitted to the PLM was used to process the samples. A small droplet of material was carefully pressed between a preheated glass microscope slide and cover-slip ensuring a uniform thin layer of sample. The sample was melted at 70° C. for 15 min to delete all crystal memory then cooled a rate of 1 K/min down to −50° C. Images were recorded at 50×, 100× and 500× magnification.

The sample was measured as it was cooling using the automatic multi-time image capture available in the PLM. The start temperature of crystallization ($T_s$) recorded at the appearance of the first "white spot" in the PLM, is observed and the development of the size and shape of the crystals were determined. The final crystal network was particularly investigated.

X-Ray Diffraction

A Panalytical Empyrean X-ray diffractometer (PANalytical B.V., Lelyweg, The Netherlands) equipped with a filtered Cu—$K_\alpha$ radiation source ($\lambda$=0.1542 nm) and a PIXcel$^{3D}$ detector was used in line-scanning mode (255 lines over 3.347 degree wide detector) for XRD measurements. The XRD patterns were recorded between 1 and 60° (2θ) in 0.026° steps, at 45 kV and 40 mA. The procedure was automated and controlled by PANalytical's Data Collector (V 3.0c) software. The samples were processed in the XRD chamber, similarly to PLM as described in section 2.1, using a 700 Series Cryostream Plus cooling system (Oxford Cryosystems, Oxford, UK) fitted to the diffractometer. The temperature was controlled to better than ±0.5° C. The data were processed and analyzed using the Panalytical'sX'PertHighScoreV3.0 software. We refer to the range 2θ=[1-15]° and [15-60]° as the small- and wide-angle scattering regions (SAXD and WAXD), respectively.

X-Ray Data Analysis and Polymorphism

The main subcell hydrocarbon-chain packing modes are commonly denoted as the α, β' and β polymorphs. The chain packing of the α-polymorph is hexagonal with non-specific chain-chain interactions. The common subcell packing of the β'-polymorph is orthorhombic, and the hydrocarbon chains of the β-polymorph are ordinarily packed parallel to each other in a triclinic (or monoclinic, if the angles α and γ are 90° C.) parallel subcell ($T_{//}$). The β-polymorph is the most stable crystal form, with the highest melting temperature, and the α-polymorph is the least stable crystal form, with the lowest melting temperature. The hydrocarbon chain layering is responsible for the characteristic small-angle (long-spacing) reflections. The period of layers normally observed for TAG structures is usually proportional to the acyl chain lengths by a factor of two or three, suggesting a double-chain length (DCL) or a triple-chain length (TCL) packing.

Microstructure of the Crystallized Mixtures

Figures 2E, 2F:
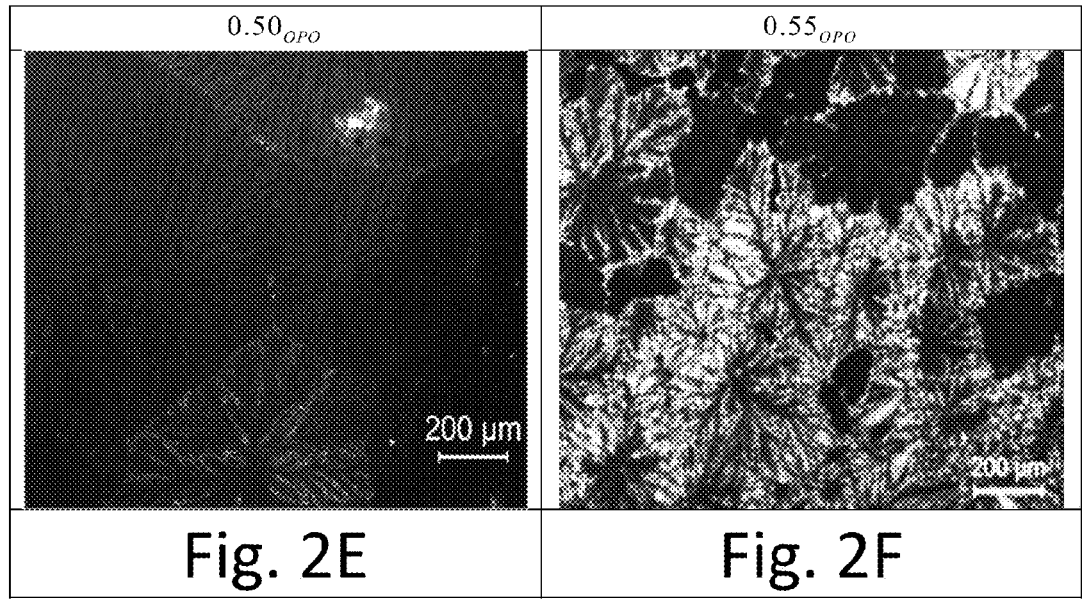
Figures 2G, 2H:
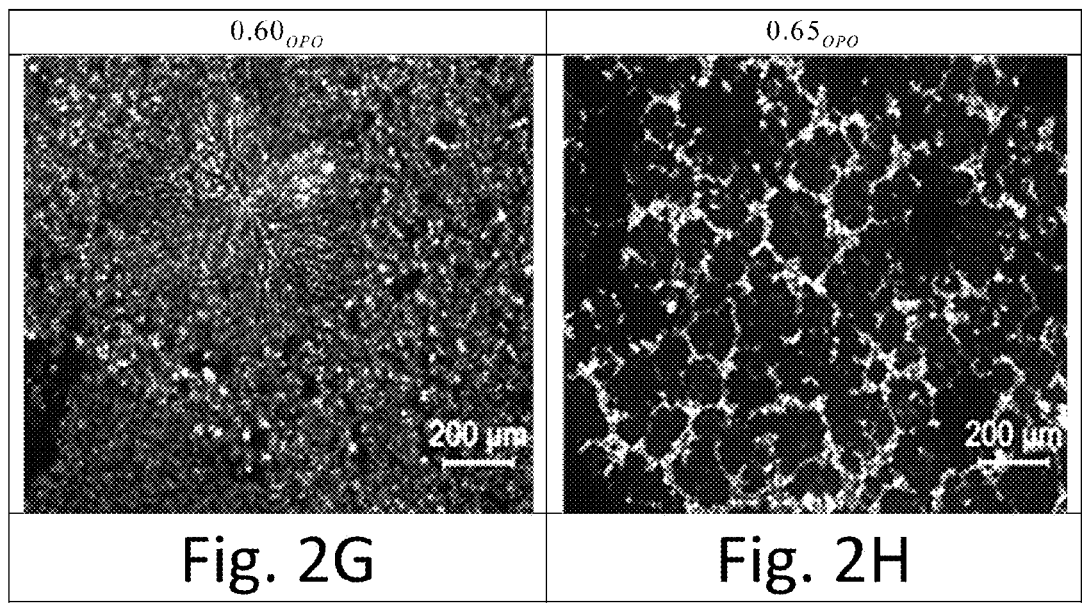

FIG. 2 shows the microstructures of selected OPO/MeP mixtures taken at −50° C. with 100× magnification. Table 1 provides a brief description of their microstructure (crystal shape, average particle size and distribution, and density) and lists the start temperature of crystallization ($T_s$) recorded at the appearance of the first "white spot" (representing the first nucleus/crystal) in the PLM, and the corresponding DSC onset temperature of crystallization ($T_{On}$) obtained using the same thermal protocol. Note that the smallest structures observable in a light microscope are of the order of 0.5 µm, due to the limitation induced by light diffraction. Therefore, structures detected by the light microscope were significantly larger than nuclei. However, for well-behaved (i.e. slow crystallizing) systems, one may assume individual crystals detected at early stages of crystallization correspond to individual nuclei. The OPO/MeP mixtures presented a variety of fat networks with distinctive crystal shapes and sizes, and a variety of spatial distributions of the solid phases. The fat networks with very large crystals were relatively not uniform compared to the networks containing smaller crystals.

As can be seen in FIG. 2, the fully crystallized pure materials (MeP and OPO) presented a microstructure noticeably different from all their mixtures. Overall, the shape of the crystals was altered and their average size considerably reduced as soon as OPO was added. The very large crystals of the solid network of pure MeP (FIG. 2a) contrast noticeably with the smaller crystals of all the MeP/OPO mixtures. The typical shape of crystals of the FAME was no longer observed immediately upon addition of the TAG. The $0.35_{OPO}$ mixture (FIG. 2b), for example, presented dispersed, medium sized highly branched dendrites of ~200 µm diameter, compared to the very long (>2500 µm) smooth leaflets of MeP. These results indicate that OPO effectively suppressed the crystal growth of MeP. The detailed quantification of this suppression is presented in the following paragraphs.

The microstructures of the special mixtures, i.e., the eutectic compositions E1 (FIG. 2c, $0.45_{OPO}$) and E2 (FIG. 2k, $0.80_{OPO}$) and the compound (FIG. 2f) were particularly interesting. These mixtures delimit concentration regions of fundamentally different microstructures. The two eutectics displayed very dense crystal networks made of small spherulitic entities. Contrary to the microstructure of E1, whose crystal network presented a granular texture at the 100× magnification, the microstructure of E2 presented fully discernible spherulites, though with some crystal clustering. Although smaller, the crystals constituting the microstructure of E2 were reminiscent of the Maltese cross shaped crystals of OPO, suggesting that the TAG is the entity initiating their crystal habit. This was also observed for all the OPO-rich mixtures. The compound mixture, on the other hand, formed a very peculiar network made of dendritic-like crystals, originating from the center and bifurcating radially (FIG. 2f-g), indicating the presence of low energy facets which evolve in a complex manner.

Figure 3:
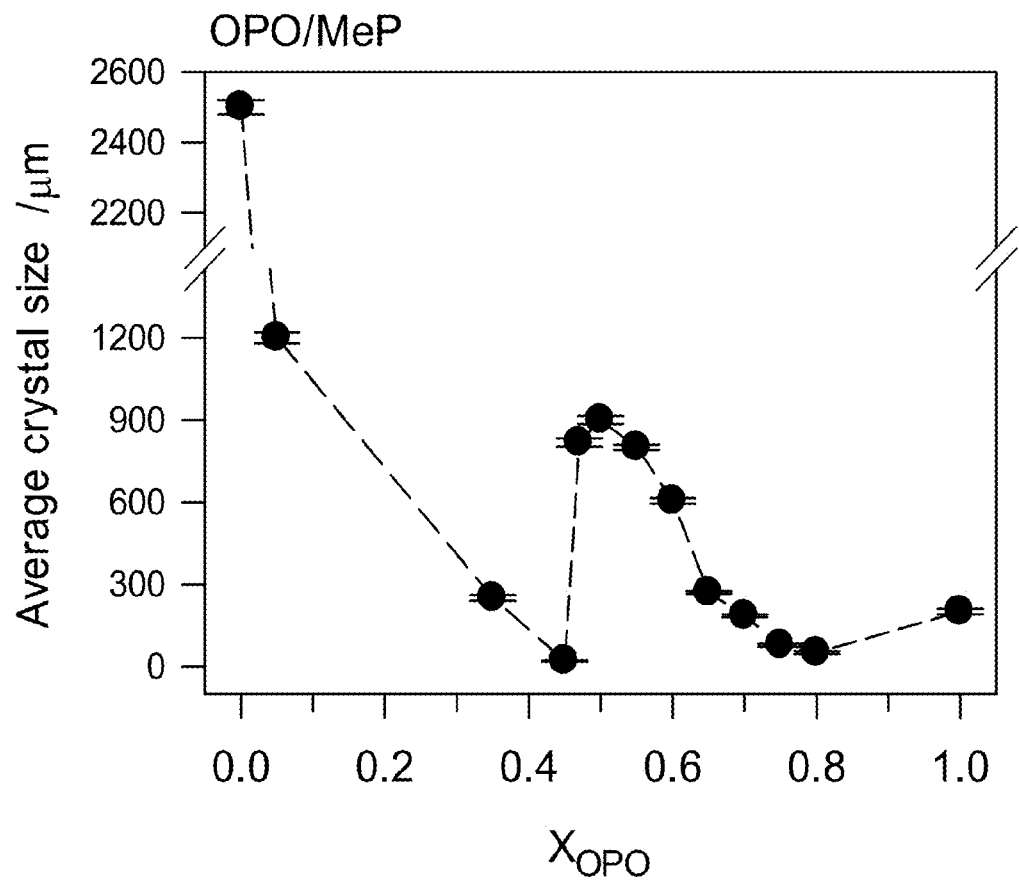
FIG. 3 depicts the average crystal size of the OPO/MeP mixtures obtained by PLM.
Figures 4A, 4B:
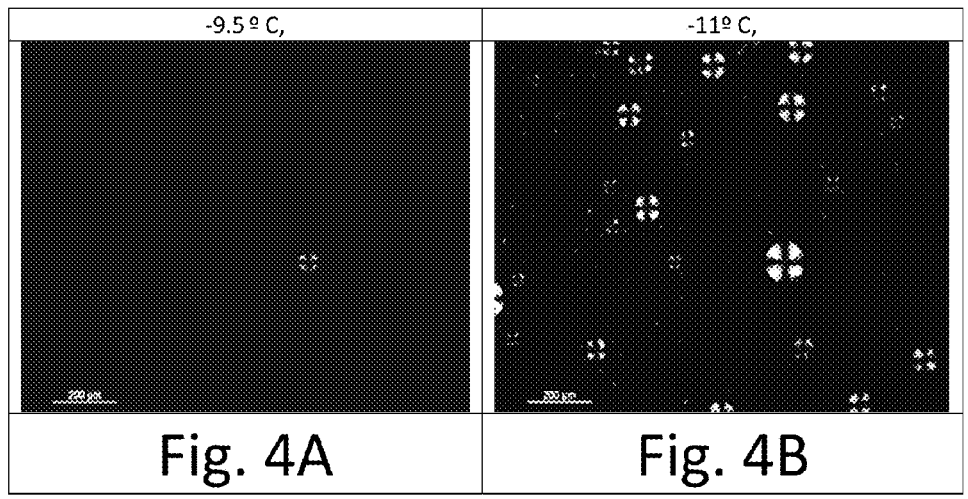
FIGS. 4A, 4B, 4C, and 4D depicts selected PLM images (100×) taken during the development from the melt of OPO microstructure. Measurement temperatures are reported on top of the slides.
Figures 4C, 4D:
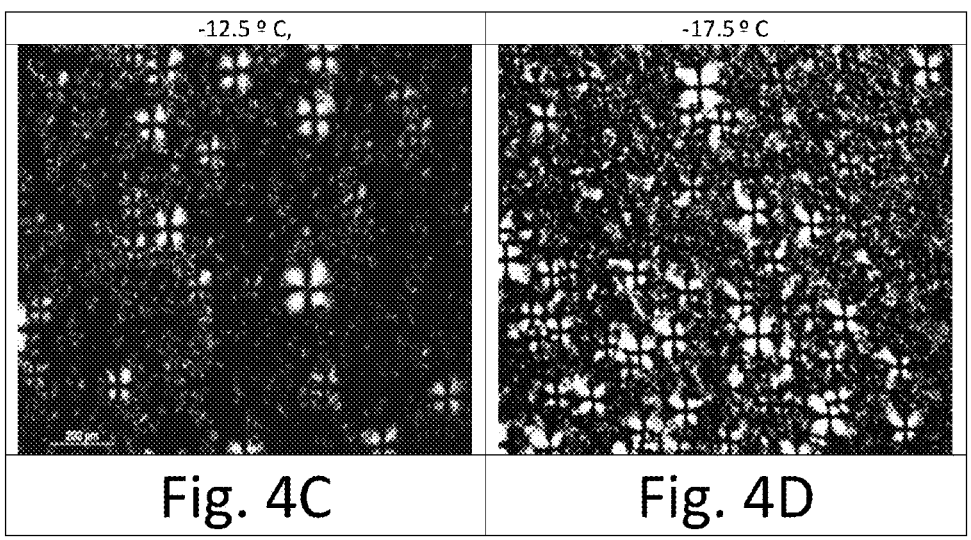

The special mixtures delimit concentration regions in the phase diagram where key elements of the final microstructure are shared. These concentration regions match perfectly the segments of the liquidus line in the phase diagram (FIG. 1). More interestingly, as can be seen in FIG. 3 showing the average size of the largest crystals versus OPO molar ratio, the change in crystal size observed for the OPO/MeP mixtures mirrored that of the liquidus line.

TABLE 1

Summary of the description of the microstructure of the different OPO/MeP samples as observed by PLM after complete crystallization (crystal shape, particle distribution, average crystal size, and network description). The mixtures were cooled from the melt at a rate of 1 K/min. The uncertainties attached are standard deviations calculated for measurements of the different crystals in the PLM.

| | $T_s$ (° C.) ± 0.5 | $T_{On}$ (° C.) | Crystal shape | Crystal size (µm) | Network description |
|---|---|---|---|---|---|
| MeP | 26.0 | 24.1 ± 0.5 | Radial needle-like fibres originating from the nucleus with palm leaf-like forking. | Very large, >2500 | Uniform. only 1 crystal observed on a slide at the 50X magnification |

TABLE 1-continued

Summary of the description of the microstructure of the different OPO/MeP samples as observed by PLM after complete crystallization (crystal shape, particle distribution, average crystal size, and network description). The mixtures were cooled from the melt at a rate of 1 K/min. The uncertainties attached are standard deviations calculated for measurements of the different crystals in the PLM.

| | $T_s$ (° C.) ± 0.5 | $T_{On}$ (° C.) | Crystal shape | Crystal size (μm) | Network description |
|---|---|---|---|---|---|
| $0.05_{OPO}$ | 24.7 | 23.2 ± 0.1 | leaf-like | 1200 | Heterogeneous with intricate distribution of the leaves |
| $0.35_{OPO}$ | | 7.7 ± 0.1 | Dispersed, medium sized highly branched dendrites | | Heterogeneous with intricate distribution of the branches. |
| E1 $0.45_{OPO}$ | 6.5 | 4.6 ± 0.1 | Very grainy Small Maltese crosses | 17-23 | Uniform Very homogeneous. Very dense. |
| $0.47_{OPO}$ | 7.0 | | Primary nucleation of large spherulites followed by small bright secondary crystals | 825 132 | Very Uniform and homogeneous distribution of the large crystals. Secondary crystals formed on top of the primary crystals. Phases are clearly separated. |
| $0.50_{OPO}$ | 12.0 | 8.5 ± 0.4 | Large radially grown branched crystals | 1100 208 | Very Uniform and homogeneous distribution of the crystals. Very straight lines of impingement. |
| Compound $0.55_{OPO}$ | 10.0 | 8.6 ± 0.2 | Non-uniformly distributed, radially grown leaf-like dendrites - not connected dendrites | 360-600 | Relatively heterogeneous distribution of the crystals. Not uniform |
| $0.60_{OPO}$ | 7.0 | 7.3 ± 0.2 | Primary Non-uniformly distributed, radially grown leaf-like dendrites - not connected dendrites followed by secondary small crystals | Large- 735 Small- 610 | Relatively Homogeneous and uniform underlying network of the large crystals. Very dense and heterogeneous upper layer of the small crystals Secondary crystals formed on top of the primary crystals. Phases are clearly separated. |
| $0.65_{OPO}$ | 10.0 | 6.7 ± 0.5 | Relatively small bright Maltese crosses connected to form a two-phase microstructure | 215 | Heterogeneous with intricate large honeycomb (about 200 μm) distribution of one phase enclosing the other. Low density |
| $0.70_{OPO}$ | 9.0 | 5.4 ± 0.2 | Relatively small bright Maltese crosses connected to form a two-phase microstructure | 184 | Heterogeneous with intricate honeycomb (about 100 μm) distribution of one phase enclosing the other. Medium density |
| $0.75_{OPO}$ | 8.0 | 2.3 ± 0.2 | small bright Maltese crosses connected to form a two-phase microstructure | 77 | Heterogeneous with intricate small honeycomb (about 30 μm) distribution of one phase enclosing the other. high density |
| E2 $0.80_{OPO}$ | -3.0 | -4.3 ± 0.2 | Very Small typical Maltese crosses | 50-80 | Very Uniform. medium density |
| OPO | -9.5 | -11.6 ± 0.6 | Small typical Maltese crosses | 200 | Very uniform, homogeneous and dense |

Development of Crystal Networks

The similarities and differences are particularly seen in the time-temperature (1 K/min) resolved PLM. The evolution of the fat network from the appearance of the first crystallites to the fully developed solid development from the melt distinguished the microstructures. The first crystals observed under the PLM had sizes in the 5-20 μm range, and were probably not the primary crystals formed upon nucleation, but rather, already grown crystals because nucleation is generally quickly followed by crystal growth.

As expected, $T_s$ decreased significantly as OPO was added to MeP, in a similar fashion to the DSC onset temperature of crystallization, $T_{On}$. One can note, however, that $T_s$ is slightly above the corresponding $T_{On}$ for all samples (Table 1). This is understandable not only because of the way the latter is determined, but also because at the early stages of crystallization, the heat released from the formation of the first few nuclei may not be captured by DSC. More fundamentally, techniques of low sensitivity for solid contents which measure crystal growth, such as DSC or pNMR, cannot evaluate accurately nucleation effects.

Microstructure Development of MeP and OPO

MeP crystallized so very rapidly at ~26° C. that only one single crystal was observed in the entire PLM slide. This can be related to the very narrow exotherm displayed by the cooling DSC thermogram of this FAME. OPO, on the other hand, crystallized much slowly, forming Maltese cross shaped crystals, typical of a spherulitic growth. As shown in FIGS. 4a-d, representing selected PLMs taken as OPO was cooling, the apparent size of the crystals increased from an estimated diameter of 20-µm for the first "early crystal" imaged at −9.5° C. to plateau three (3) minutes later with an average size of 200 µm. The relatively slow growth observed by PLM is attributable for a large part to the effect of the peculiar geometry of the OPO molecule due to the cis-double bonds on crystal growth.

Microstructure Development of Eutectic E1

The first white small spot in the PLM of the eutectic composition E1 ($X_{OPO}$=0.45) was observed at 6.5° C. (FIG. 5a). This first crystallite, contrary to the case of OPO, was followed by a burst of small crystals filling the PLM slide within a very short interval of time (FIG. 5a-b). These crystals developed very rapidly into small spherulites of ~17 to 23 µm average sizes (FIG. 5c). The microstructure developed further into a dense and very homogeneous grainy network in which the crystals appeared to gradually lose their individuality due to clustering (FIG. 5d). There were no noticeable changes in the microstructure of E1 below 3° C.

Microstructure Development of Eutectic

Figures 6A, 6B:
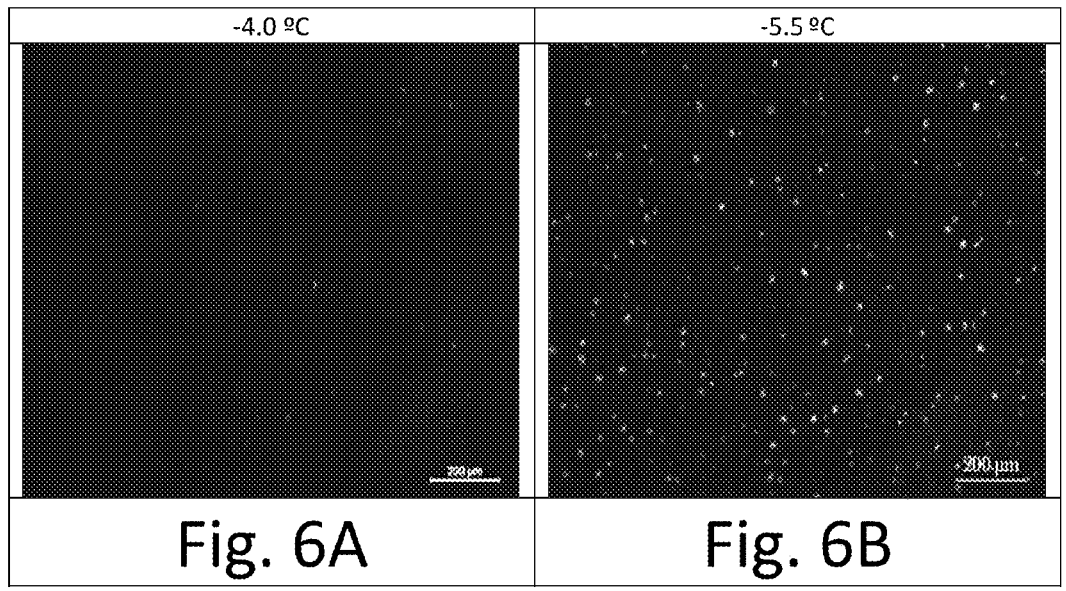
FIGS. 6A, 6B, and 6C depicts selected PLM images (100×) taken during the development from the melt of the microstructure of the second eutectic composition, E2 ($X_{OPO}$=0.80). Measurement temperatures are reported on top of these figures.
Figure 6C:
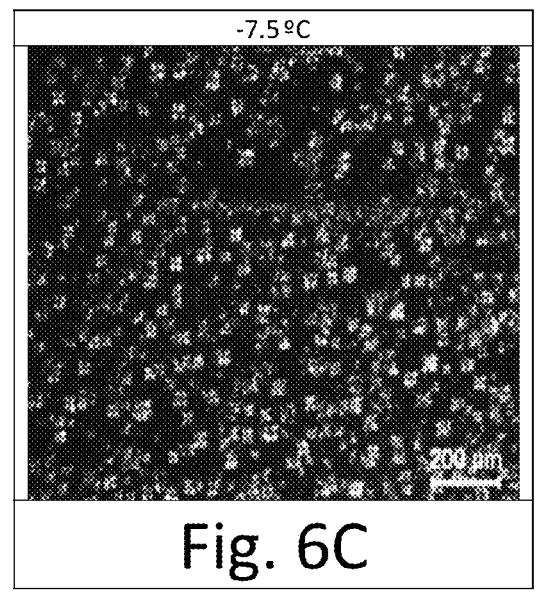

The first crystals (nucleation) of the second eutectic composition E2 ($X_{OPO}$=0.80) were observed at −4° C. (FIG. 6a). Similarly to E1, the first white spot observed in the PLM was followed by the formation of very small spherulitic crystals which very rapidly filled the microscope slide (FIG. 6b). The crystals grew relatively slowly and reached sizes of 50-80 nm at ~−7.5° C. (FIG. 6c). Note that some of the crystals eventually clustered, but unlike for the microstructure observed at E1, the individuality of the crystallites seemed to be preserved as suggested by the relatively well resolved impingement boundaries.

Figures 7A, 7B:
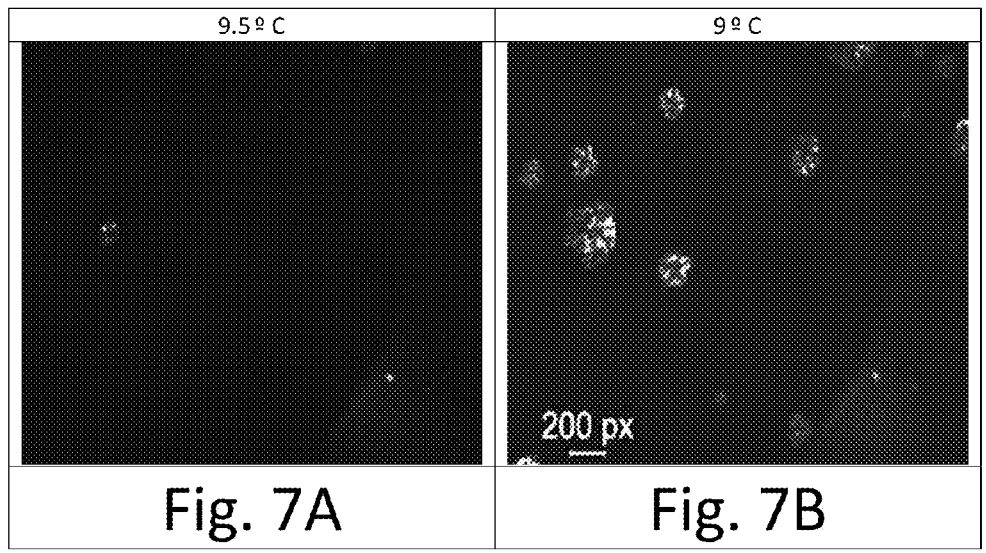
FIGS. 7A, 7B, 7C, and 7D depicts selected PLM images (100×) taken during the development from the melt of the microstructure of the compound mixture ($0.55_{OPO}$). Measurement temperatures are reported on top of these figures.
Figures 7C, 7D:
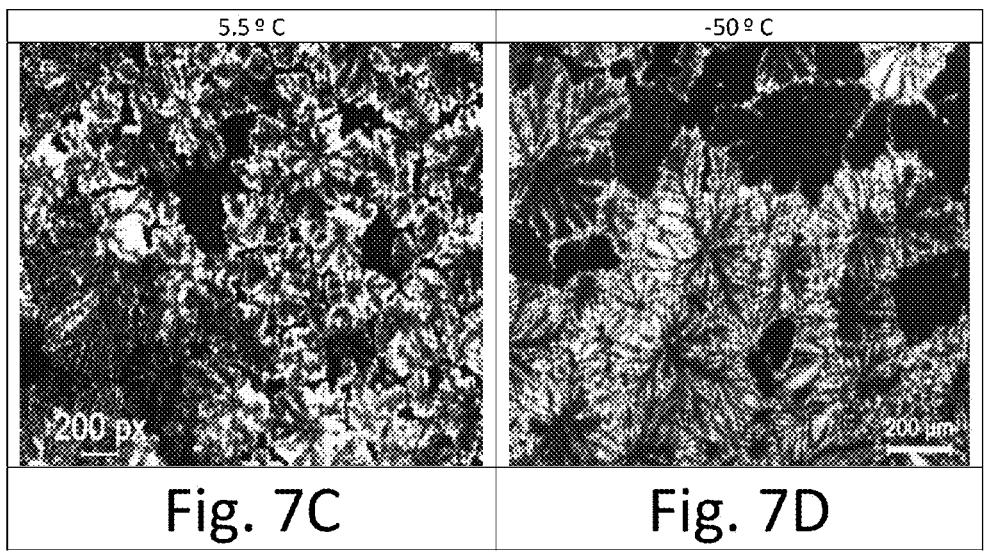

Microstructure Development of the Compound and Compositions Between the Eutectics The compound was central to the understanding of the microstructure development in the OPO/MeP binary system. The crystallization of the compound composition ($0.55_{OPO}$) started at 9.5° C. and completed at 5° C. (FIG. 7a-c). The number of apparent crystals increased relatively rapidly as crystallization proceeded, but contrary to the microstructure development at E1 and E2, slowly enough to allow for an accurate counting of the crystals during 3 minutes. The crystals grew radially forming dendritic bifurcations. From a 50-µm diameter when they were first spotted, the size of the crystals increased to ~100 µm 30 s later to reach ~500-800 µm at the complete crystallization, indicating a relatively high growth rate. Note that no new crystal or further growth was observed below 7° C. In fact, the microstructure of the mixture did not show any further change upon cooling down to −50° C. The final microstructure was formed of a complex intertwined network of these relatively large dendritic spherulites (FIG. 7d). Note that the $0.50_{OPO}$ sample presented a similar crystal development with spherulitic crystals made of very complex leaflet-like branches with size comparable to those of the $0.55_{OPO}$.

On the two sides of the 50% mixture, the microstructure of the $0.47_{OPO}$ and $0.60_{OPO}$ samples evolved similarly from the melt and formed similar networks. The crystallization in both mixtures started with very few small crystals (one or two) which grew rapidly into very large spherulites reminiscent of the crystals observed for the $0.50_{OPO}$ sample. As the sample was cooled further, small and bright crystals formed via secondary nucleation on top of the existing network in both cases. However, the secondary crystals of $0.47_{OPO}$ evolved into bifurcating flocks, whereas, those of $0.60_{OPO}$ were very small Maltese crosses. It is reasonable to assume that crystals (large spherulites) observed for the $0.50_{OPO}$ sample were those of a phase made of the 1:1 compound which coexisted with a MeP phase (small flocks) in the case of the $0.47_{OPO}$ sample and with an OPO phase (small Maltese crosses) in the case of $0.60_{OPO}$. Notably, the presence of the compound hindered the full development of both MeP and OPO into the respective networks that they would achieve alone.

Figure 8:
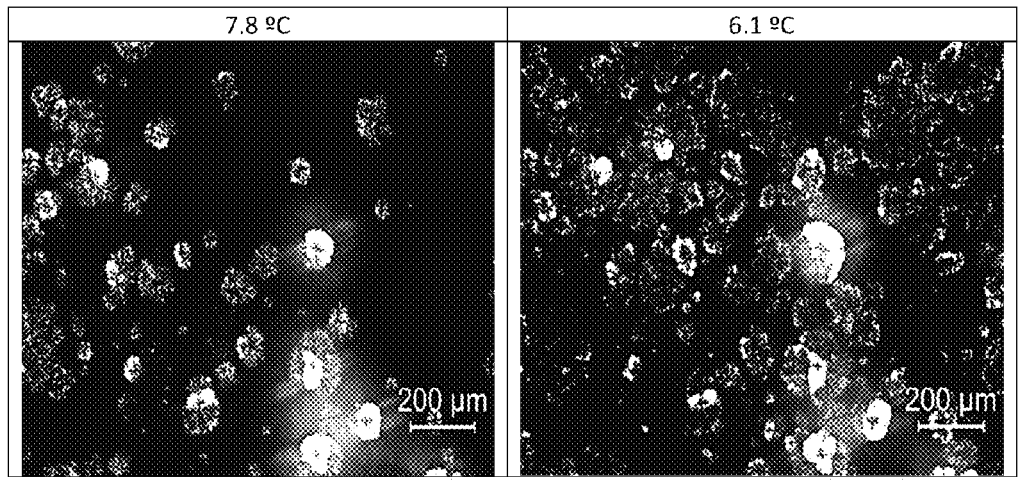
FIG. 8 depicts PLM of $0.65_{OPO}$ taken at selected temperatures (reported on top of the images). Images were taken at 100× magnification during the cooling process.
Figure 8:
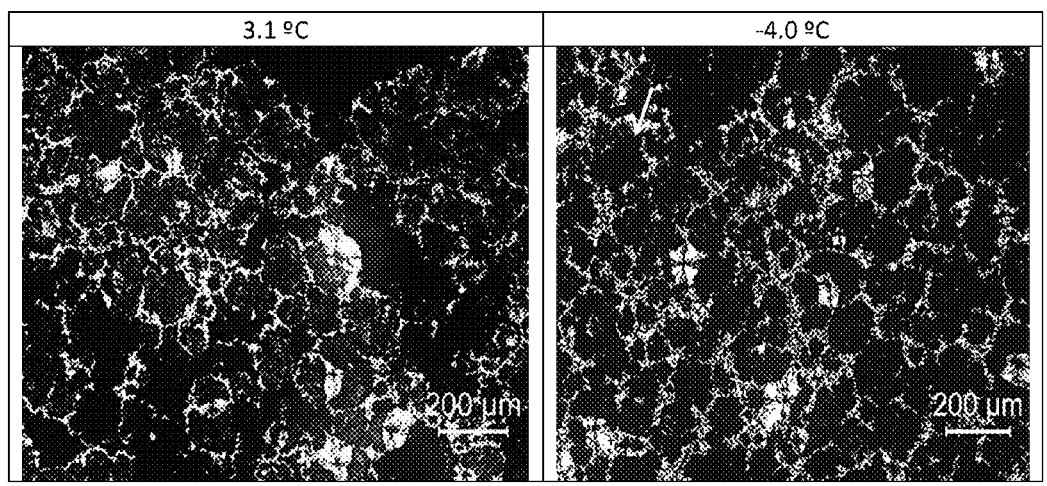
Figure 9:
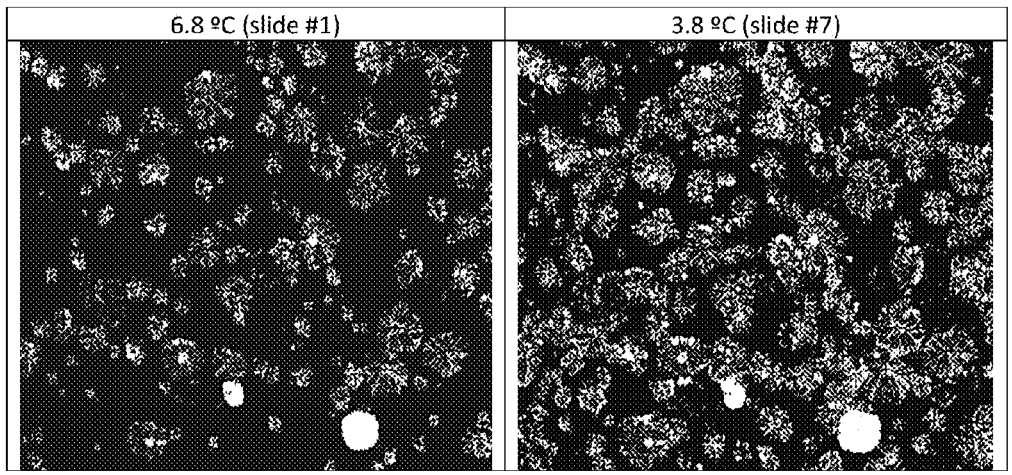
FIG. 9 depicts PLM of $0.70_{OPO}$ taken at selected temperatures (reported on top of the images). Images were taken at 100× magnification during the cooling process. Multi time images were taken in intervals of 30 s.
Figure 9:
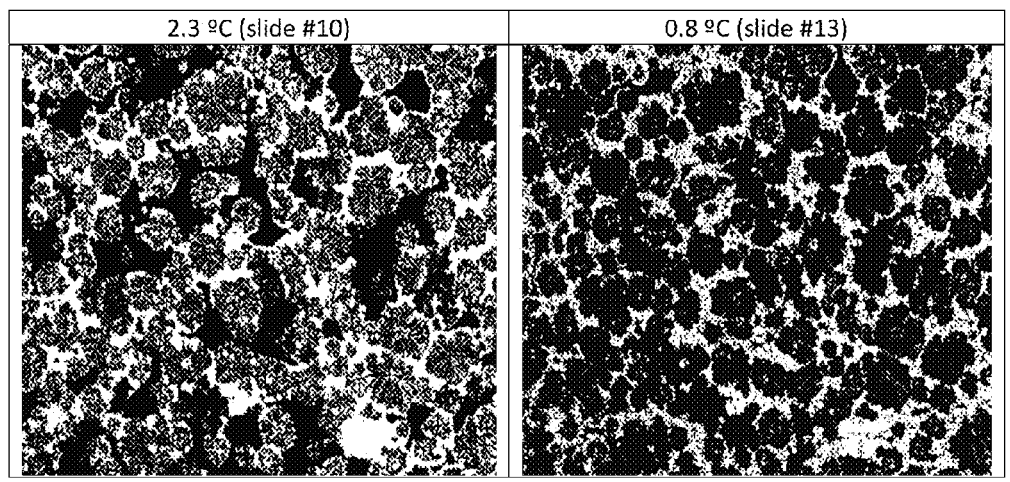
Figure 10:
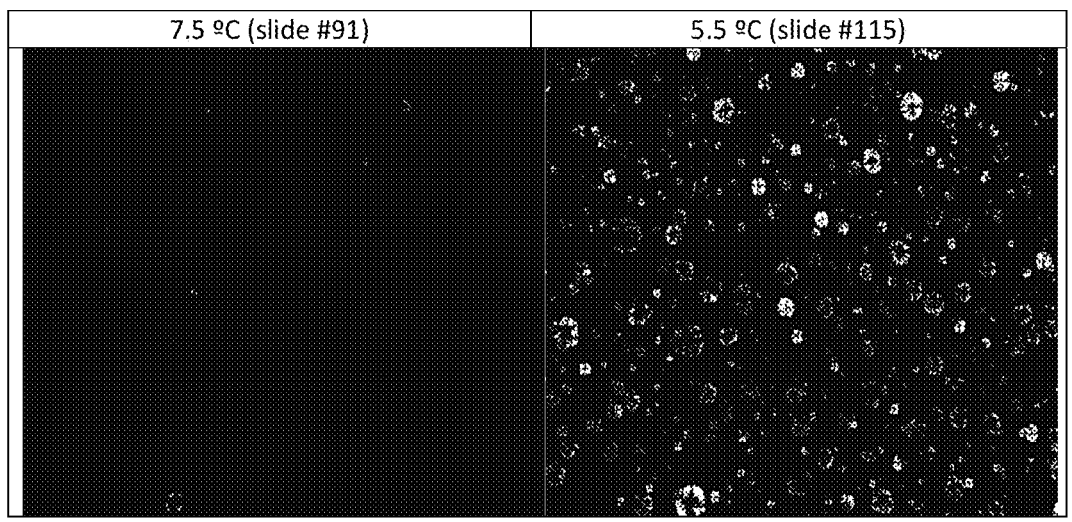
FIG. 10 depicts PLM of $0.75_{OPO}$ taken at selected temperatures (reported on top of the images). Images are taken at 100× magnification during the cooling process. Multi time images were taken in intervals of 5 s.
Figure 10:
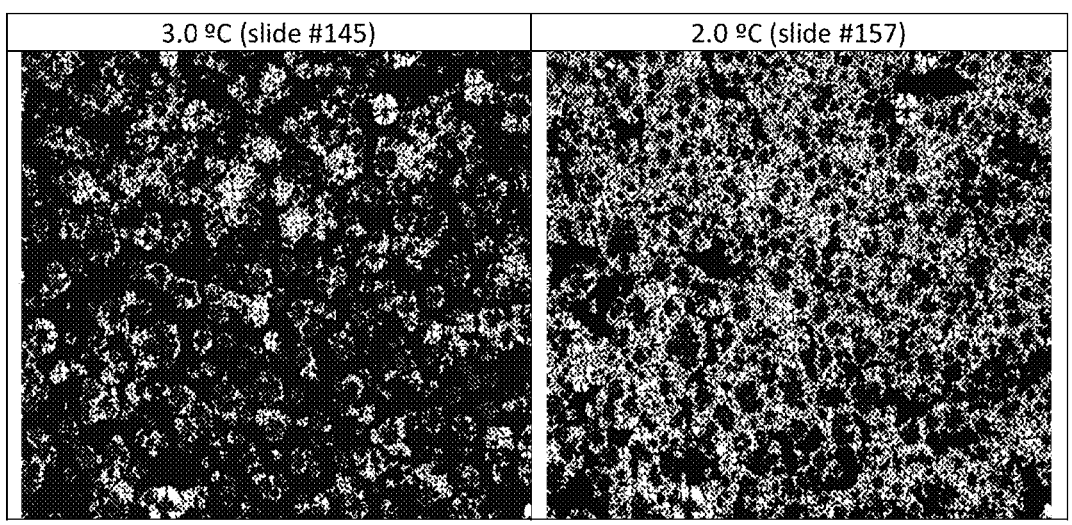
Figures 11A, 11B:
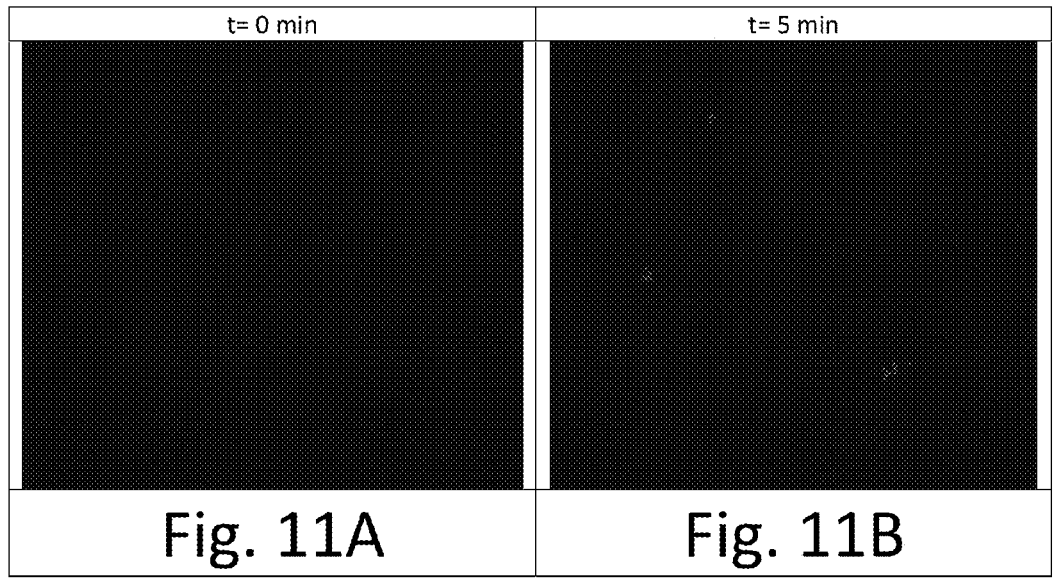
FIGS. 11A, 11B, 11C, and 11D depicts PLMs taken at selected times (500× magnification) during the isothermal crystallization (T=−4° C.) of the second eutectic composition E2 ($X_{OPO}$=0.80).
Figures 11C, 11D:
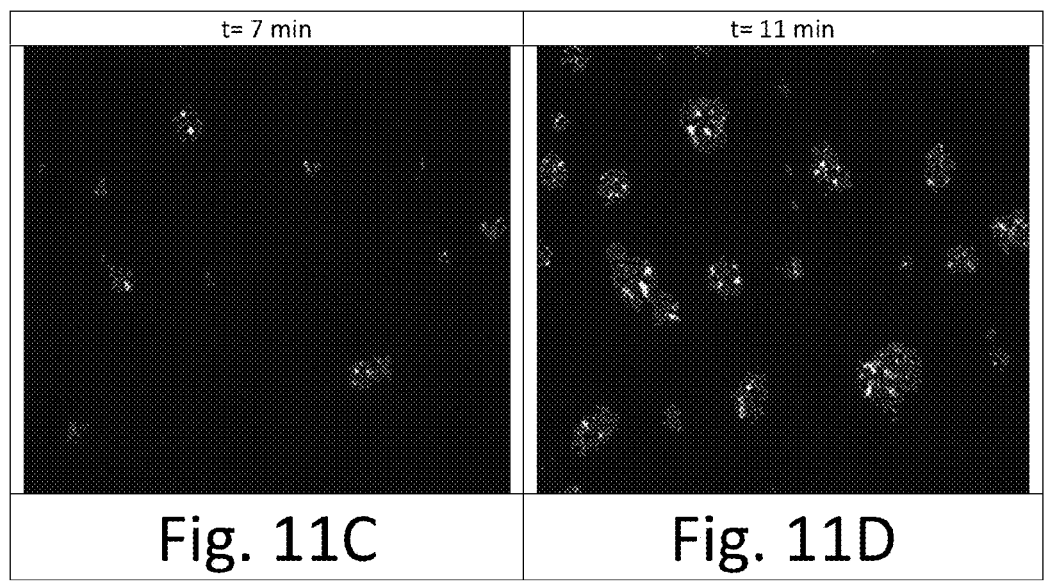

Development of the Microstructure of $0.65_{OPO}$, $0.70_{OPO}$ and $0.75_{OPO}$ The PLMs of the $0.65_{OPO}$, $0.70_{OPO}$ and $0.75_{OPO}$ samples taken at selected temperatures during cooling (1 K/min) are shown in FIGS. 8-10, respectively. The crystal development (formation, growth, size and type of crystals) and final fat network of these mixtures were similar to those of the second eutectic composition. The PLM of these mixtures started showing a very small number of crystals which increased rapidly. The crystals themselves grew slowly, and then impinged to form an intricate honeycomb-like microstructure. Beside the two different morphologies observed in the fully crystallized material (white honeycomb contour and fill), which are probably constituted of the two solid phases of the binary eutectic reaction, one can notice a coexisting third phase made of Maltese cross-like crystals (arrow in FIG. 8), reminiscent of an OPO-rich phase. As the concentration approaches the eutectic (PLMs from $0.65_{OPO}$ to $0.75_{OPO}$), the number of starting crystals became higher and their size smaller. Also, the honeycombs making up the final microstructure became smaller, indicating that it is OPO related.

Nucleation Progress Estimated by PLM

The nucleation progress can be estimated by following the evolution of the number of individual crystals showing in the PLM, when such counting is possible. The variation of the number of crystals with temperature gives an idea of the rate of formation of the crystals. However, when individual crystals can be individually counted and the rate of nucleation is low, the rate of crystals formation (number of crystals per time) can be reasonably substituted for the rate of nucleation. Note that there is a limit to which the number of crystals can be accurately counted in a PLM slide.

Figure 12A:
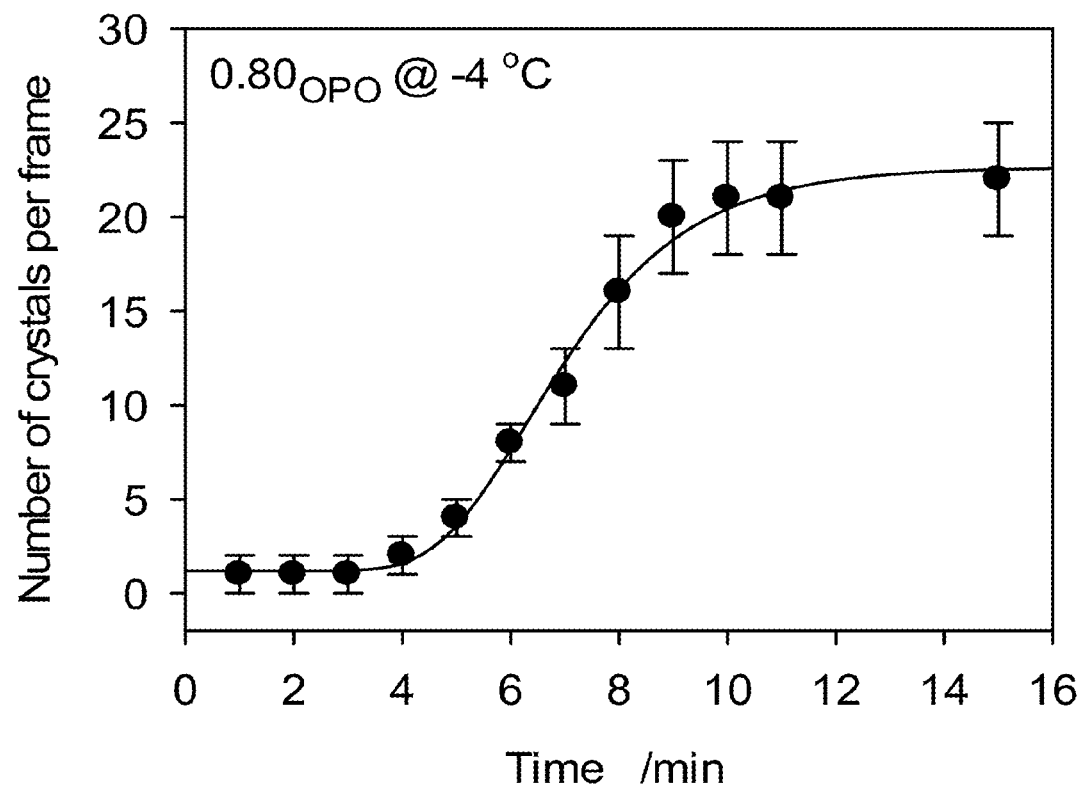
FIGS. 12A, 12B, and 12C depicts the (a) the isothermal crystallization (−4° C.) of the OPO/MeP compound mixture and as a function of temperature during the non-isothermal crystallization of (b) OPO and (c) compound mixture. The solid line is tentative fit of the experimental data to a sigmoidal function and a visual.

The evolution of the microstructure of second eutectic composition E2 ($X_{OPO}$=0.80) was followed isothermally at the temperature (−4° C.) at which the first "nucleus" was spotted. PLM taken at selected times are shown in FIG. 11a-d (500× magnification). As can be seen in the figures, the crystallization proceeded through sporadic nucleation and spherulitic growth. The estimated number of crystals versus time is shown in FIG. 12a. The data were successfully fitted with a typical sigmoidal function. Such a trend suggests that the transformation proceeded through a simple crystallization mechanism.

The number of such crystals at the two eutectics increased so rapidly during the non-isothermal crystallization that it was very difficult to follow their progress. Accordingly, nucleation rate was very high. The number of apparent crystals of OPO (FIG. 12b) and compound mixture (FIG. 12c) versus temperature curves presented typical sigmoidal shapes with plateaus at ~7.5° C. and −12.5° C., respectively. Note that it was no longer possible to count individual crystals beyond these temperatures, due to clustering.

Although the plot of the number of crystals versus time gave the typical sigmoidal shaped curve, it was not a measure of the volume of the new phase to which the Avrami model is usually applied. It was rather a function of the spatial distribution of mass and only in part a function of the solid content which can be described by an Avrami-like model (Equation 1).

$$\frac{y}{y_{max}} = 1 - e^{-k(t-t_0)^n} \quad \text{Equation 1}$$

y describes the number fraction of crystals as a function of time and $y_{max}$ is its limiting value as time approaches infinity. k is an Avrami-like apparent rate constant and n an Avrami-like exponent. t is the time and $t_0$ is the induction time.

This is particularly relevant when clusters are present or when already grown crystals "absorb" emerging nuclei. However, PLM is a sensitive enough technique to study nucleation, but needs special care for the analysis of its results and the number of single (discernible) entities that can be used as a lower limit for the description of nucleation progress. The results of the application of the model, despite its notable restriction, would provide a means of comparison. As can be seen from Table 2, the Avrami-like parameters of OPO and the compound were very different, indicating differences in both nucleation and spatial distribution of the crystals and can be related to differences in crystal growth.

Figure 12B:
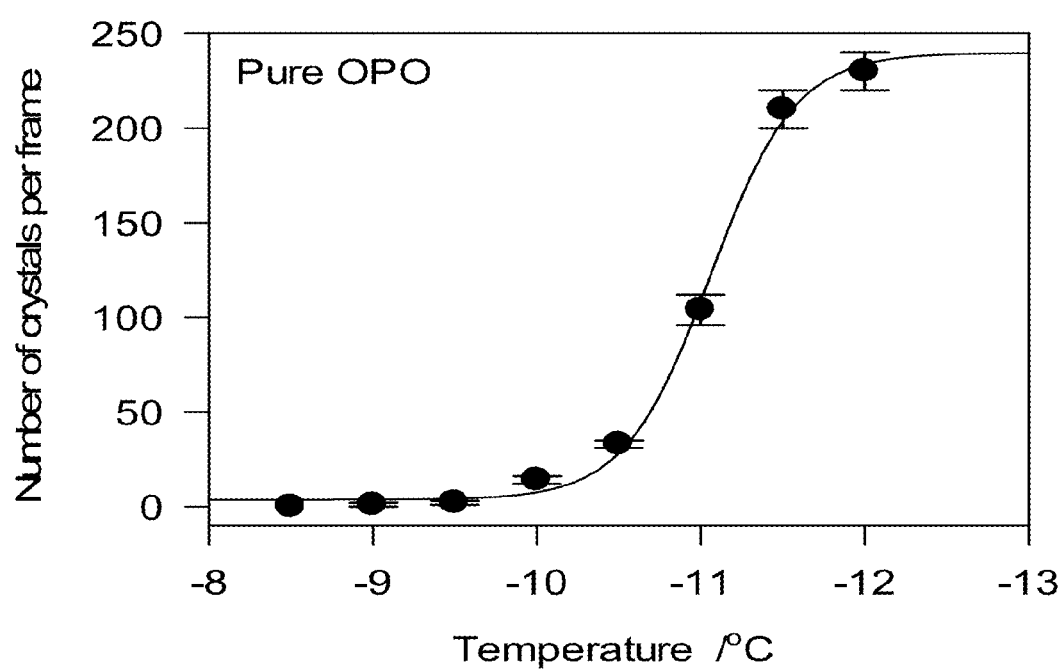
Figure 12C:
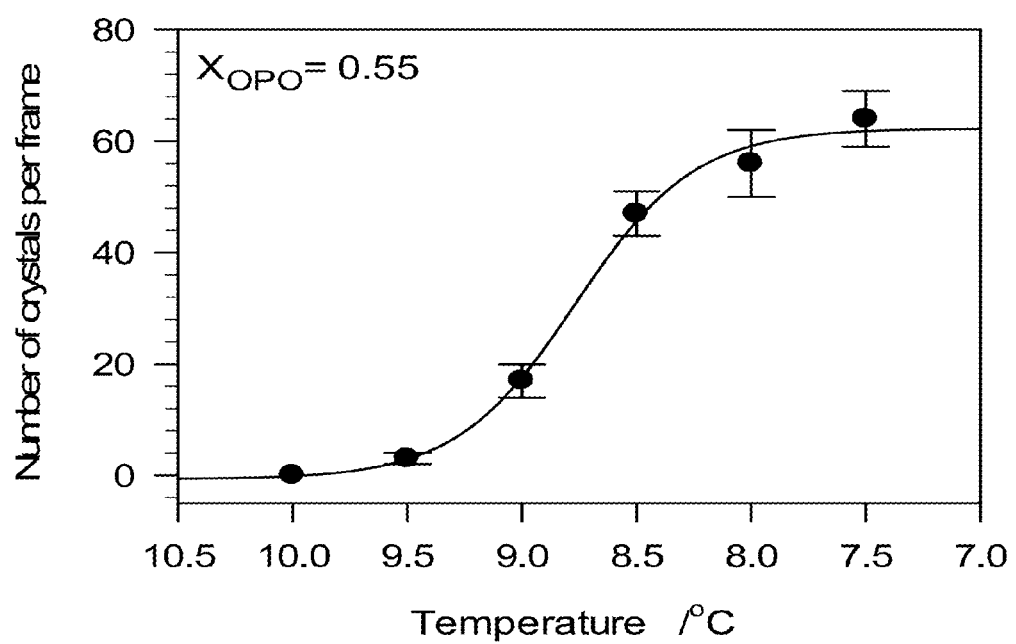

TABLE 2 results of the application of an Avrami-like model to number of crystal of OPO and the compound mixtures shown in FIG. 12a and 12b, respectively.

|  | Rsqr | Std Err | k | n |
|---|---|---|---|---|
| OPO | 0.994499 | 0.033985 | 0.008 ± 0.003 | 4.9 ± 0.4 |
| Compound | 0.987577 | 0.051071 | 0.086 ± 0.027 | 3.3 ± 0.4 |

TABLE 2-continued results of the application of an Avrami-like model to number of crystal of OPO and the compound mixtures shown in FIG. 12a and 12b, respectively.

|  | Rsqr | Std Err | k | n |
|---|---|---|---|---|
| OPO, T = −4 C. | 0.995341 | 0.028850 | 0.0004 ± 0.0002 | 3.9 ± 0.2 |

Crystal Structure of OPO/MeP

Subcell Structure

Figure 13A:
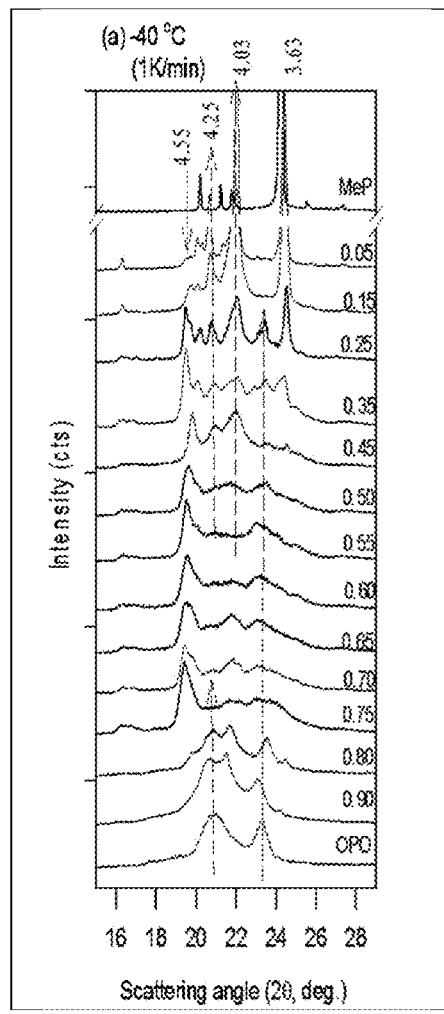
FIGS. 13A and 13B depicts the (a) WAXD spectra (15-30° scattering angle) of selected compositions of OPO/MeP measured at −40° C. after cooling from the melt at a constant rate (1 K/min). OPO molar ratios in the OPO/MeP mixtures are reported on the right side above the patterns. (b) Intensity of the 3.65 Å line versus OPO molar fraction.

The WAXD spectra (15-30° scattering angle) of selected compositions of OPO/MeP measured at −40° C. after cooling from the melt at a constant rate (1 K/min) are shown in FIG. 13a. The d-spacing and corresponding Miller indices are listed in Table 3. As can be seen in the figure, the crystal lines of the OPO/MeP mixtures were superimposed onto a wide halo, particularly noticeable for mixtures with more than 25% molar OPO, indicating the presence of a liquid phase at the measurement temperature (−40° C.).

Three polymorphic forms were detected: the monoclinic structure of MeP ($\beta_M$), the orthorhombic form of OPO ($\beta'$) and a triclinic structure ($\beta$) found in all mixtures with varying content. Careful attention should be taken in order to follow the variation of the relative polymorphic contents because some of the characteristic lines are very close. The presence of the relatively large liquid phase introduces an extra uncertainty in the estimation of the relative content of the coexisting phases. The analysis of the WAXD crystal peaks was carried out after the contribution of the liquid phase was removed. Therefore, the trends obtained allowed an accurate description of the qualitative as well quantitative changes in the crystal phases as a function of concentration.

Figure 13B:
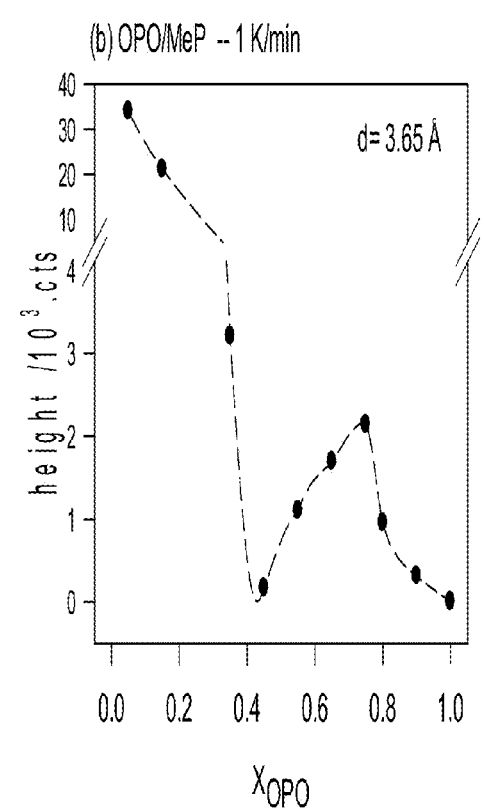

The variation of the intensity of the 3.65 Å line is shown in FIG. 13b. The noticeable decrease observed from pure MeP to the eutectic composition E1 ($0.45_{OPO}$) indicates that it originated from the $\beta_M$-phase and can, therefore, be used to estimate the variation of the monoclinic phase in this region of concentration.

TABLE 4

WAXD data: d-spacing of resolved lines and corresponding Miller indices. Samples were cooled from the melt at a rate of 1 K/min. Patterns measured at −40° C. Uncertainty = ±0.05.

|  | $010_\beta$ |  |  | $110_{\beta'}$ | $0\bar{1}0_\beta$ | $102_\beta$ or $020_{\beta'}$ | $\bar{1}00_\beta$ | $200_{\beta'}$ |  | $100_\beta$ |
|---|---|---|---|---|---|---|---|---|---|---|
| MeP |  | 4.45 | 4.29 | 4.17 | 4.10 | 4.02 | 3.87 |  |  | 3.65 |
| $0.05_{OPO}$ | 4.52 |  | 4.29 |  | 4.08 | 4.03 | 3.84 | 3.79 |  | 3.64 |
| $0.15_{OPO}$ | 4.50 |  | 4.28 | 4.24 | 4.09 | 4.03 | 3.84 | 3.77 |  | 3.64 |
| $0.25_{OPO}$ | 4.56 |  |  |  |  | 4.03 |  |  |  |  |
| $0.35_{OPO}$ | 4.55 | 4.42 | 4.29 | 4.23 | 4.07 | 4.02 | 3.87 | 3.78 |  | 3.64 |
| $0.45_{OPO}$ | 4.54 | 4.48 |  | 4.24 | 4.07 | 4.00 | 3.9 | 3.76 |  | 3.63 |
| $0.50_{OPO}$ | 4.56 |  |  | 4.23 | 4.07 |  |  |  |  |  |
| $0.55_{OPO}$ | 4.55 | 4.49 | 4.29 | 4.27 | 4.06 |  | 3.86 |  | 3.72 | 3.54 |
| $0.60_{OPO}$ | 4.54 |  |  | 4.28 |  | 4.01 |  |  |  |  |
| $0.65_{OPO}$ | 4.56 | 4.47 |  | 4.26 | 4.08 | 4.04 | 3.84 |  | 3.71 | 3.64 |
| $0.70_{OPO}$ | 4.47 |  |  | 4.28 |  | 4.07 |  |  |  |  |
| $0.75_{OPO}$ | 4.56 | 4.46 |  | 4.22 | 4.06 |  |  | 3.78 |  | 3.66 |
| $0.80_{OPO}$ |  | 4.47 |  | 4.25 | 4.09 | 3.97 |  | 3.78 |  | 3.64 |
| $0.90_{OPO}$ |  | 4.48 |  |  |  |  | 3.85 | 3.79 |  | 3.67 |
| OPO |  |  |  | 4.22 |  |  |  | 3.87 |  |  |

The XRD pattern of OPO displayed two main peaks characteristic of the β'-form at d-spacings of 4.23±0.07 Å (110) and 3.86±0.04 Å (200). The 4.55 Å and 3.63 Å lines, characteristic peaks of the β-form which were detected in the $0.90_{OPO}$ mixture, increased noticeably and reached a maximum intensity for the $0.75_{OPO}$ mixture. These two lines also appeared for the MeP rich mixtures. As OPO was added to MeP, their intensity increased steadily to reach a maximum before the eutectic composition. In this concentration region, the β-phase coexisted with, but increased to the detriment of the monoclinic phase of MeP as OPO content was increased. Note that the monoclinic phase content decreased from 0 to $0.45_{OPO}$ where it disappeared. The mixtures between $0.45_{OPO}$ and $0.75_{OPO}$ presented only the characteristic lines of the triclinic symmetry. The WAXD pattern of the compound composition was unique although clearly one of a β-polymorph. It showed unique features such as the appearance of a line at ~4.0 Å which is distinct from the 4.03 Å line shown by the WAXD patterns of MeP rich mixtures, and the extinction of a few peaks between $2\theta=19.6°$ and 23°. Note that unlike the shoulder-line at 4.50 Å whose intensity varied with concentration, the intensity of the 4.55 Å line remained almost constant for the mixtures of this range of concentration. This indicated that even if the overall crystal structure remained the same, the details of the subcell organization and electronic density distribution varied as a function of OPO content.

The WAXD data indicated that two different b-phases were at play in the OPO/MeP binary system. The pure OPO at −40° C. only showed the characteristic reflections from the orthorhombic crystal system. As soon as MeP molecules were included the ensemble of OPO molecules, a rearrangement of molecules occurred in order to accommodate the MeP with OPO. As the concentration of MeP was increased to $0.75_{OPO}$ (second eutectic) the intensity of the (4.55 Å) characteristic reflection of the β-form increased noticeably while its corresponding d-spacing decreased due to better molecular rearrangements and order along the 010 direction.

The microstructure observed for the MeP-rich mixture was associated with the monoclinic phase which was predominant in this range. The large decrease of the size of the crystals making up this phase indicated that the monoclinic symmetry is versatile enough to accommodate such a wide range of crystal sizes. The relatively large crystals observed for the compound and the mixtures which where exclusively triclinic, suggest that the β-form was limited in the range of microstructures that it can accommodate. It was noticeably favoring inhomogeneous fat networks made of large crystals. The small size of the crystals of the OPO-rich mixtures indicated that the orthorhombic symmetry was more prone to constitute a more homogeneous microstructure with small crystals. This finding may help in the designing of specific protocols for biodiesel and biodiesel additives which would optimize both the crystallization temperature and size related problems of biodiesel.

Lamellar Packing

Figure 14:
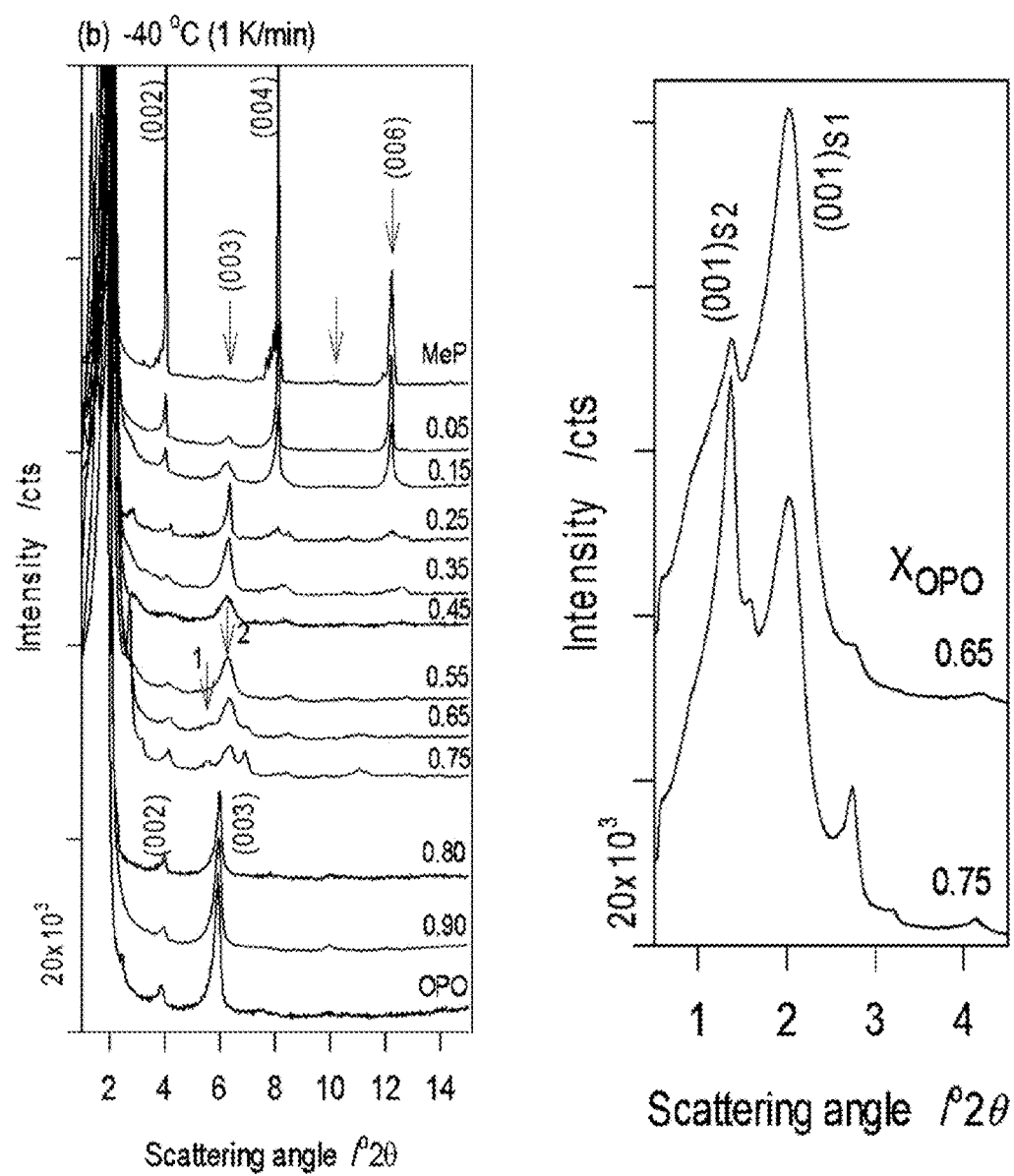
FIG. 14 depicts (on the left) SAXD spectra (1-15° scattering angle) of selected compositions of OPO/MeP measured at −40° C. after cooling from the melt at a constant rate (1 K/min). OPO molar ratios in the OPO/MeP mixtures are reported on the right side above the patterns. On the right, is a zoom into the 001 reflections of $0.65_{OPO}$ and $0.75_{OPO}$ mixtures.

SAXD spectra (1-15° scattering angle) of selected compositions of OPO/MeP measured at −40° C. after cooling from the melt at a constant rate (1 K/min) are shown in FIG. 14a. The d-spacing and corresponding Miller indices are listed in Table 4. The SAXD of the pure MeP displayed a number of sharp and strong peaks. The d-value of the first order (001) reflection represented the thickness of the molecular layers and higher order (001)-reflections indicated regular, periodic structures and represent the periodical sequence of electronic density differences in multiple layers.

TABLE 4

SAXD data: d-spacing and corresponding Miller indices. Samples were cooled from the melt at a rate of 1 K/min. Patterns measured at −40° C. Uncertainty = ±0.15.

| MeP | (001) | (002) | (003) | (004) | (005) | (006) |
|---|---|---|---|---|---|---|
|  | 43.87 | 21.74 | 14.42 | 10.87 | 8.61 | 7.23 |
| $0.05_{OPO}$ | 43.01 | 21.77 | 14.07 | 10.86 |  |  |
| $0.15_{OPO}$ | 41.74 | 21.75 | 14.04 | 10.87 |  |  |
| $0.25_{OPO}$ | 41.86 |  | 13.89 |  |  |  |
| $0.35_{OPO}$ | 41.80 | 21.07 | 13.95 | 10.63 |  |  |
| $0.45_{OPO}$ | 41.80 | 21.51 | 14.09 | 10.49 |  |  |
| $0.50_{OPO}$ | 42.41 |  | 13.97 |  |  |  |
| $0.55_{OPO}$ | 42.26 | 21.33 | 13.96 | 10.25 |  |  |
| $0.80_{OPO}$ | 44.15 | 22.06 | 14.69 |  |  |  |
| $0.90_{OPO}$ | 45.20 | 22.07 | 14.76 |  |  |  |
| OPO | 44.24 | 22.34 | 14.58 |  |  |  |

|  | S1 | | | | | S2 | | |
|---|---|---|---|---|---|---|---|---|
|  | (001) | 002 | (003) | 004 | $I_2/I_1$ | (001) | 002 | (004) |
| $0.60_{OPO}$ | 42.38 | 21.21 | 13.91 | 10.44 | 0.1 | 63.05 |  |  |
| $0.65_{OPO}$ | 42.50 |  | 13.59 |  | 0.2 | 63.15 | 31.50 | 15.15 |
| $0.70_{OPO}$ | 43.31 | 21.07 | 13.93 |  | 0.5 | 63.30 | 31.70 |  |
| $0.75_{OPO}$ | 42.87 | 21.17 | 13.87 |  | 1.5 | 63.35 | 31.93 | 15.29 |

There were three distinct groups of patterns each sharing similar features indicative of similar lamellar arrangements. They were delimited by the eutectic compositions ($0.45_{OPO}$, $0.80_{OPO}$) and the compound composition $0.55_{OPO}$. The XRD patterns of the mixtures with $X_{OPO} \leq 0.45$ displayed the same 001 reflections as MeP (uppermost pattern in FIG. 14). In this group, the intensity of the 001 reflection remained almost constant whereas that of 002, 004 and 006 decreased noticeably and disappeared completely for the eutectic composition (see for example the variation of the intensity of the 006 reflection in FIG. 14). The special case of the 003 reflection is discussed in the following paragraphs. This clearly indicates the noticeable disrupting effect of OPO on the periodical sequence of electronic density differences in the layering of MeP. Although the repeat unit $d_{001}$ decreased from ~44 Å for pure MeP to 42 Å from $0.15_{OPO}$ to $0.45_{OPO}$, the period of layers along the layer normally observed for these structures is proportional to the acyl chain lengths by a factor of two. This limited shortening of repeat unit length was probably due to adjustments of the MeP head groups to the glycerol backbone of the TAG.

The SAXD patterns of the mixtures with $X_{OPO} > 0.75$ presented the same reflections as OPO, with a repeat layering unit of ~44.5 Å. This was very close to published values of the double chain length (DCL) stacking of the β'-form of OPO.

The 003 reflection which was very weak in MeP increased to reach a maximum for the $0.55_{OPO}$ mixture then decreased to disappear from the SAXD pattern of $0.80_{OPO}$. Such a variation of this reflection with $X_{OPO}$ was associated with the presence of the compound (in the β-form) alongside a MeP-rich phase and an OPO-rich phase on the left and right concentration sides.

Figure 15A:
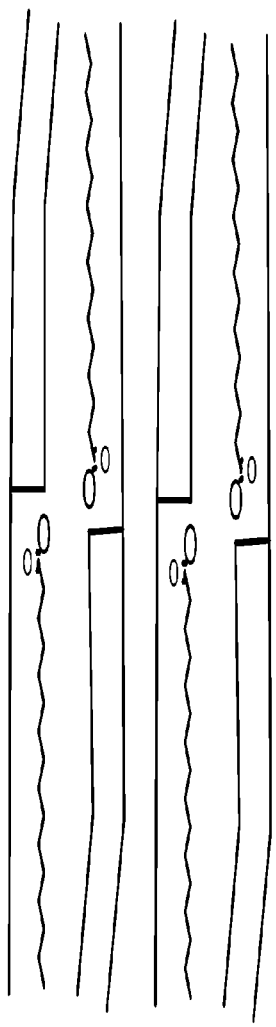
FIGS. 15A, 15B, and 15C depicts schematic representations of the crystalline structures of OPO and OPO:MeP molecular compound. The models are depicted on the basis of the lamellar distances obtained from X-ray diffraction. The β'-phase of OPO (a) and the β-phase of the compound (b) pack in bilayer structures, whereas, the $β_1$-phase of OPO (c) have the triple layer structure. The lamellar thickness ($d_{001}$) of each polymorph is reported above each structure.
Figure 15B:
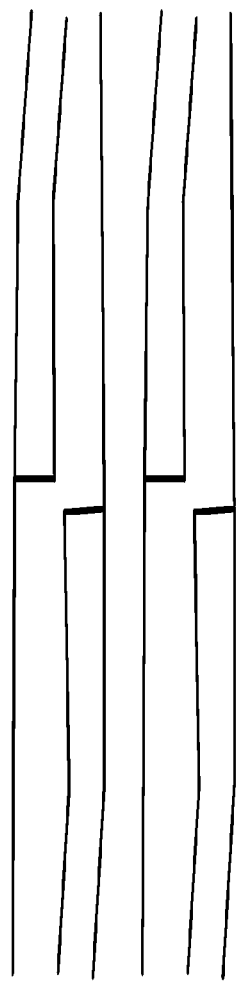
Figure 15C:
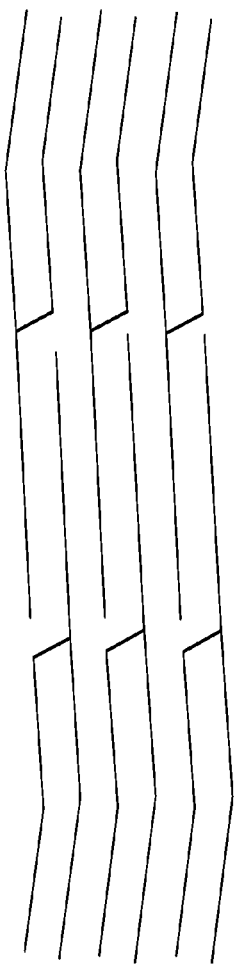

The mixtures from $0.60_{OPO}$ to $0.75_{OPO}$ presented two types of stacking (Table 4). The first (S1 in Table 4) was similar to the patterns of the compound with a repeat layer unit of 42.5 Å, and hence associated with the layering of its β-phase. The second stacking (S2 in Table 4) presented a 001 line at ~63.5 Å accompanied with weak 002 and 004 reflections. As illustrated in FIG. 14b, showing the two 001 reflections of $0.65_{OPO}$ and $0.75_{OPO}$ mixtures, the intensity of the 63.5 Å line increased noticeably relative to the 42.5 Å line from ~0.01 to 1.5 as OPO ratio was increased (Table 4), clearly indicating an OPO-rich phase origin. Similarly to previous publication for the triple chain structure of the OPO, the 63.5 Å line is undoubtedly associated with the β-form of OPO, and specifically to its highest stability $β_1$-form. The coexistence of these two crystal structures in these mixtures can be directly related to the two phases observed in their microstructure observed by PLM. Schematic representations of the crystalline structures of the β'- and $β_1$-phases of OPO, and the β-phase of the compound depicted on the basis of the lamellar distances obtained from X-ray diffraction are shown in FIG. 15.

The SAXD lines from the $0.60_{OPO}$ to $0.75_{OPO}$ compositions were less intense compared to those of MeP and OPO, indicating a less localized electronic density, probably due to relaxed packing of OPO and MeP in the unit. The larger width of all the (001) reflections detected for these mixtures indicated also that chain arrangement in this new packing is looser and much more disordered that that of the pure constituents of the mixtures.

As a general recap, the analysis by PLM and XRD of the 1,3-dioleoyl-2-palmitoyl glycerol (OPO) and methyl stearate (MeP) mixtures provided detailed information of the microstructure and crystal structure of the binary system. The TAG was found to noticeably impact the polymorphism as well as the microstructure development of the FAME. The study of the binary system at the nano- and micro-length scales proved that the TAG impacted the phase behavior of the FAME at both the nucleation and crystal growth processes levels. The mechanism proposed for the manner in which the TAG delays crystallization and reduces crystal size was supported by substantial evidence. The disturbance of crystallization was shown at both the nanostructure and microstructure levels. The TAG-induced changes in the crystallization of the FAME were evidenced by specific changes to crystal structure and polymorphism, and microstructure, i.e., fat network and crystal shape and habit. OPO promoted the formation of a significant number of nuclei resulting in reduced crystal size of the FAME. The noticeable decrease in crystal size is closely associated to the variation in melting temperature as described by the onset temperature of crystallization determined by PLM, and as shown by the liquidus line in the phase diagram constructed by DSC. Furthermore, the changes in the polymorphism correlated very well with the changes observed in microstructure. The MeP-rich mixtures crystallized presented a monotectic symmetry alongside a growing MeP-triclinic symmetry whereas the OPO-rich mixtures crystallized in the orthorhombic symmetry alongside a growing OPO-rich triclinic symmetry. The compound mixture presented only a triclinic phase.

The foregoing detailed description and accompanying figures provided a fundamental understanding necessary to optimize the use of structured additives for the improvement of the cold flow behavior of biodiesel through suppression of crystallization and reduction of crystal size. Moreover, the foregoing detailed description and accompanying figures have been provided by way of explanation and illustration, and are not intended to limit the scope of the invention. Many variations in the present embodiments illustrated herein will be apparent to one of ordinary skill in the art, and remain within the scope of the claims and their equivalents.

What is claimed is:

1. A biodiesel crystallization depressant composition comprising a triacylglycerol comprising 1,3-dioleoyl-2-palmitoyl glycerol, wherein the 1,3-dioleoyl-2-palmitoyl glycerol is mixed with a biodiesel fuel comprising methyl palmitate to a desired molar fraction, $X_{OPO}$, where X ranges from greater than 0 to 1.0, and further wherein the 1,3-dioleoyl-2-palmitoyl glycerol begins crystallization depression from inception of addition down to a maximum at molar fraction $0.45_{OPO}$.

2. The composition of claim 1, wherein the mixture of the 1,3-dioleoyl-2-palmitoyl glycerol and the methyl palmitate comprises one or more eutectics.

3. The composition of claim 2, wherein the mixture of the 1,3-dioleoyl-2-palmitoyl glycerol and the methyl palmitate comprises a eutectic at molar fraction $0.45_{OPO}$, wherein an average crystal size is less than 25μm at $0.45_{OPO}$.

4. The composition of claim 2, wherein the mixture of the 1,3-dioleoyl-2-palmitoyl glycerol and the methyl palmitate comprises a eutectic at molar fraction $0.80_{OPO}$, wherein an average crystal size is less than 80μm at $0.80_{OPO}$.

5. The composition of claim 1, wherein at a molar fraction $0.55_{OPO}$, the composition begins crystallization at 9.5° C. and completes crystallization at 5.5° C.

6. The composition of claim 1, wherein from molar fraction areater than $0.0_{OPO}$ to molar fraction $0.45_{OPO}$, the mixture of the 1,3-dioleoyl-2-palmitoyl glycerol and the methyl palmitate comprises monoclinic and triclinic forms.

7. The composition of claim 6, wherein the monoclinic form decreases from molar fraction greater than $0.0_{OPO}$ to molar fraction $0.45_{OPO}$, wherein a eutectic occurs at molar fraction $0.45_{OPO}$.

8. The composition of claim 1, wherein from molar fraction $0.45_{OPO}$ to molar fraction $0.75_{OPO}$, the mixture of the 1,3-dioleoyl-2-palmitoyl glycerol and the methyl palmitate comprises triclinic forms.

9. The composition of claim 1, wherein from molar fraction $0.75_{OPO}$ to molar fraction $1.0_{OPO}$, the mixture of the 1,3-dioleoyl-2-palmitoyl glycerol and the methyl palmitate comprises orthorhombic and triclinic forms.

10. The composition of claim 3, wherein at the eutectic at lolar fraction $0.45_{OPO}$, the mixture of the 1,3-dioleoyl-2-palmitoyl glycerol and the methyl palmitate comprises a granula crystal network of spherulitic entities.

11. The composition of claim 4, wherein at the eutectic at molar fraction $0.80_{OPO}$, the mixture of the 1,3-dioleoyl-2-palmitoyl glycerol and the methyl palmitate comprises fully discernible spherulites with some crystal clustering.

12. The composition of claim 1, wherein at a 1:1 compound mixture, the mixture forms a network made of dendritic-like crystals.

* * * * *

UNITED STATES PATENT AND TRADEMARK OFFICE
CERTIFICATE OF CORRECTION

PATENT NO.         : 9,637,697 B2
APPLICATION NO.    : 14/209462
DATED              : May 2, 2017
INVENTOR(S)        : Suresh Narine et al.

Page 1 of 1

It is certified that error appears in the above-identified patent and that said Letters Patent is hereby corrected as shown below:

In the Claims

Claim 1, Column 16, Line 9, "3-dioleoyi-2" should read -- "3-dioleoyl-2" --

Claim 1, Column 16, Line 10, "dioleoyi" should read -- "dioleoyl" --

Claim 6, Column 16, Line 31, "fraction areater" should read -- "fraction greater" --

Claim 10, Column 16, Line 47, "lolar fraction" should read -- "molar fraction" --

Claim 11, Column 16, Line 52, "palrnitoyl glycerol" should read -- "palmitoyl glycerol" --

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*